United States Patent [19]
Iida et al.

[11] Patent Number: 6,137,700
[45] Date of Patent: Oct. 24, 2000

[54] CONVERTER WITH A HIGH POWER FACTOR USING A DC CENTER POINT VOLTAGE

[75] Inventors: Masakazu Iida; Reiji Kawashima, both of Shiga, Japan

[73] Assignee: Daikin Industries, Ltd., Osaka, Japan

[21] Appl. No.: 09/289,602

[22] Filed: Apr. 12, 1999

Related U.S. Application Data

[63] Continuation of application No. PCT/JP97/03605, Oct. 8, 1997.
[51] Int. Cl.$^7$ .............................. H02M 5/42; H02M 7/04
[52] U.S. Cl. ........................... 363/89; 363/143; 323/282; 323/299
[58] Field of Search .................................... 363/143, 126, 363/89, 125, 84; 323/222, 282, 284, 266, 299

[56] References Cited

U.S. PATENT DOCUMENTS

| | | | |
|---|---|---|---|
| 4,268,899 | 5/1981 | Rokas | 363/61 |
| 4,837,672 | 6/1989 | Donze | 363/143 |
| 4,937,731 | 6/1990 | Konopka | 363/143 |
| 5,088,019 | 2/1992 | Williams et al. | 363/69 |
| 5,162,984 | 11/1992 | Castagnet et al. | 363/61 |
| 5,287,263 | 2/1994 | Shilo | 363/143 |
| 5,572,415 | 11/1996 | Mohan | 363/61 |
| 5,661,348 | 8/1997 | Brown | 363/126 |

FOREIGN PATENT DOCUMENTS 2724507  3/1996  France .

OTHER PUBLICATIONS

Article entitled Passive Power Factor Correction for DC Power Supplies; IBM Technical Disclosure Bulletin, vol. 30, No. 4, dated Sep. 1987; and.
Article entitled A New Single Phase AC to DC Harmonic Reduction Converter Based on the Voltage–Doubler Circuit, by H.O. Aintablian, and H. W. Hill; dated Sep. 5, 1994.
translated copy of PCT Request.
copy of PCT/IB/304.
copy of PCT/IB/338.

*Primary Examiner*—Peter S. Wong
*Assistant Examiner*—Bao Q. Vu
*Attorney, Agent, or Firm*—Smith, Gambrell & Russell, LLP

[57] ABSTRACT

Switching control is remarkably simplified and a DC voltage is boosted, and then, an input power factor is sufficiently improved and harmonics are reduced by connecting a full-wave rectifier circuit to an AC power source through a reactor, and connecting a smoothing capacitor and boosting capacitors, which are connected in series with each other, in parallel between the output terminals of the circuit. In addition, a switching device is connected between the input terminal of the circuit and the connecting point between the boosting capacitors, and a control device is provided to control the switching device so that the switching device can be switched at every half cycle of the power source voltage.

15 Claims, 35 Drawing Sheets

PRIOR ART

CONVERTER WITH A HIGH POWER FACTOR USING A DC CENTER POINT VOLTAGE

This application is a continuation of PCT/JP97/03605, filed Oct. 8, 1997.

TECHNICAL FIELD

The present invention relates to a converter. More particularly, the present invention relates to a converter which has an arrangement that a full wave rectifier circuitry is connected to AC power and capacitors serially connected to one another are connected between output terminals of the full wave rectifier circuit.

BACKGROUND ART

In recent years, a technique is being developed rapidly for reducing in size and for improving in efficiency of an inverter and a motor which are employed in an air conditioner. But, improvement in performance of a converter is a necessary matter which acts as a power source of the inverter and the motor for improving performance of an entire system. Therefore, technical development of a converter having high performance is required to be performed in a hurry. In addition, trouble to a transmission system or other devices has become a social problem which trouble is due to harmonics in power sources which harmonics flow out from a power converter. In Europe, standard values in harmonics in power sources (IEC100-3-2) have already been established by IEC (International Electrotechnical Commission) in the year of 1996. Further, in Japan, self-imposed control on harmonics currents (harmonics guide-lines for home electric devices and popular devices) has started from the year of 1996 under generalization of the resources and energy office.

A converter popularly employed from the past has an arrangement that a smoothing capacitor is connected between output terminals of a full-wave rectifier circuit through a reactor, as is illustrated in FIG. 1(a). When the converter having the arrangement is employed, enlarging effect in the conduction angle of an input current due to the reactor is expected, as is illustrated in FIG. 1(b). But, a great improvement effect in the power factor cannot be realized (the maximum power factor is about 80%) because delay in the phase of a fundamental wave is great. Further, the IEC standard (class A) cannot be satisfied in harmonics, as is illustrated in FIG. 1(c).

By taking the above problems into consideration, a converter which is called charge pump system, as is illustrated in FIG. 2(a), for improving power factor performance is employed as a converter which is especially employed in an air conditioner connected to a 200 V power system of a single phase. And, improvement performance in power factor exceeding 85% is realized. But, in this converter, a capacitor serially connected to a power source system and an inductance component of the power source system constitute a series resonance circuit. Therefore, an input current thereof greatly includes tenth through thirtieth harmonics, as is illustrated in FIG. 2(b), so that the converter becomes a power source which is not adapted to the harmonics guide-lines for home electric devices and popular devices, as is illustrated in FIG. 2(c). The IEC standard does not take system impedance into consideration, but it is not an adaptable level. Further, a DC voltage of a converter is nearly equal to a peak value of power source voltage (about 280 V for 200 V power source system) at its maximum (unloaded).

The DC voltage is decreased following an increase in load due to the voltage drop caused by inserting the reactor. When the DC voltage is decreased, a current should be increased in inverse proportion to the DC voltage so that an increase in cost and increase in size of an inverter and motor are needed. Further, a driving frequency extent of a motor is practically determined based upon an application voltage so that lowering in DC voltage causes reduction in the driving frequency extent of a motor.

On the other hand, a converter of voltage doubler system is widely employed, as is illustrated in FIG. 3(a), as a converter of a 100 V power system of a single phase. It is known that an output voltage becomes a twice voltage of a power source voltage and that harmonics generation amount is suppressed to be a relatively low level when this system is employed. When this system is employed in a 200 V power system, the DC voltage is excessively raised when load is light and the DC voltage reaches twice voltage (560 V) of a peak value of the power voltage when load is opened (load is broken). Therefore, resisting voltages of parts should be increased which are connected downstream with respect to the converter. Especially, when a power converter or the like including switching elements such as an inverter is connected, a resisting voltage of the switching elements should be determined to be about a twice voltage. Consequently, the device is increased in size and is increased in cost greatly. Further, a voltage doubler current is greatly advanced in phase with respect to a power voltage phase basically, as is illustrated in FIG. 3(b). The converter of voltage doubler system employs a reactor of about 20% for maintaining a high power factor which converter is employed in an air conditioner which is input a 100 V power system. When a reactor having similar current smoothing power is realized in a 200 V power system, an inductance of the reactor becomes about four times inductance. Therefore, the reactor departs from a practical use level due to increase in size and increase in cost of a reactor.

In recent years, a power factor improving converter employing a boosting chopper is proposed, as is illustrated in FIG. 4(a), for solving problems of the above converters. This converter controls an ON-duty of the boosting chopper so as to control a DC voltage using control circuitry which is input an input voltage, input current, DC voltage, and DC voltage command value. A input power factor can be controlled to be about 1, as is illustrated in FIG. 4(b). Further, a DC current can freely be changed, and a voltage can be boosted to infinity in principal, so that this converter is an ideal converter.

Further, a converter having an arrangement that a reactor is connected between an output terminal of each phase of a three phase AC power source and each input terminal of three phase rectifier circuit and that a smoothing capacitor is connected between output terminals of the three phase rectifier circuit, is known as a converter which is connected to the three phase AC power source, as is illustrated in FIG. 19(a). When the converter having the above arrangement is employed, input power factor improvement effect and reducing effect, to some degree, reduce harmonics currents due to the reactors, as is illustrated in FIG. 19(b). But, it is difficult to satisfy the IEC standard class A, as is illustrated in FIG. 19(c) when DC power is supplied to a device of equal to or more than several kW.

For solving the problem, a PWM (pulse width modulation) converter may be employed which employs six switching elements, as is illustrated in FIG. 20(a). When this PWM converter is employed, input currents are controlled by high frequency switching so that the input currents can be controlled not to include harmonics components and are controlled to determine input power factor to be 1. Specifically, an equivalent circuit of each phase of this PWM converter becomes a circuit which is illustrated in FIG. 20(c). Therefore, no harmonic components are included in the input current iu when the input voltage vu of the converter is determined to have a sine waveform. That is, a voltage vector diagram becomes a diagram which is illustrated in FIG. 20(d). Therefore, reduction of harmonic components in the input currents is realized by generating PWM patterns of converter input voltages so as to determine the converter input voltages to have sine waveforms, the PWM patterns being generated by a method which is recited in "current controlling method which takes parameter change of a three phase PWM converter into consideration (sansou PWM konbata no parame-ta hendou wo kouryoshita denryuu seigyo hou)", Takaharu Takeshita, Makoto Iwasaki, Nobuyuki Matsui, Dengakuron D, Vol. 107, No. 11, Sho-62.

Further, multiplex system or multiplex stage system using transformers is employed in many cases in a large capacity device having a large capacity to some degree such as a converter for transmitting a DC power, a rectification device for a furnace or the like. For example, a three phase 12-pulses rectifier circuit system is employed which is recited in Japanese Patent Laid-Open Gazette Tokukaihei 2-142357. The arrangement of this system is illustrated in FIG. 21. This system employs a transformer. The primary windings are connected in star connection, while the secondary windings are connected in a star connection and in a delta connection. Therefore, output voltage phases are shifted by $\pi/6$ from one another. The double system is realized by connecting a couple of three phase diode rectification circuits in parallel to one another to the secondary windings which are isolated from one another. In this system, the power voltage waveform of u-phase is a waveform which is illustrated in FIG. 22(a). The input currents of the three phase diode rectifier circuit are currents having a conduction width of $2\pi/3$, as are illustrated in FIG. 22(b), the three phase diode rectification circuit is connected to the star connection of the secondary windings of the transformer. The input currents of the three phase diode rectification circuit are currents which are in delay of phase by $\pi/6$ with respect to the input currents which are illustrated in FIG. 22(b), as are illustrated in FIG. 22(c), the three phase diode rectification circuit is connected to the delta connection of the secondary windings of the transformer. Therefore, the currents flowing in the primary windings of the transformer becomes currents {refer to FIG. 22(e)} which are obtained by adding the input currents illustrated in FIG. 22(b) and currents {refer to FIG. 22(d)} which are obtained by performing delta-star conversion to the input current illustrated in FIG. 22(c).

But, when the power factor improvement converter using a boosting chopper is employed, controlling of a switch becomes extremely complicated and a high-potency filter is necessary for working out a countermeasure for noises which flow out towards the power source system. Therefore, cost is increased greatly. Also, efficiency is lowered because losses are great which are due to high frequency components of a current which flows through the reactor.

Further, when the PWM converter having the arrangement illustrated in FIG. 20(a) is employed, efficiency is lowered following the high frequency switching, noises are increased, as the input current waveform and input voltage waveform are illustrated in FIG. 20(b), and the controlling becomes complicated, and the cost is increased.

Furthermore, when the three phase 12-pulses rectifier circuit system having the arrangement illustrated in FIG. 21 is employed, the transformer and a plurality of three phase diode rectification circuits are necessary. Therefore, the system is increased in size in its entirety, and the system is greatly increased in cost.

DISCLOSURE OF INVENTION

The present invention was made in view of the above problems.

It is a first object of the present invention to offer a converter which greatly simplifies controlling of switching, realizes sufficient input power factor improvement, and realizes sufficient reduction in harmonics.

It is a second object of the present invention to realize boosting of a DC voltage.

It is a third object of the present invention to remove or reduce specific harmonic components within an entire load changing extent.

It is a fourth object of the present invention to maintain a fundamental wave power factor of the input current to be 1.

It is a fifth object of the present invention to supply a stable DC voltage despite change in power source voltage and change in load.

It is a sixth object of the present invention to simplify an arrangement greatly.

A converter of a first embodiment according to the present invention comprises,
  a reactor,
  a full-wave rectifier circuit having input terminals and output terminals which circuit is connected to an AC power source through the reactor,
  a smoothing capacitor which is connected between the output terminals of the full-wave rectifier circuit,
  boosting capacitors connected in series to one another and connected in parallel to the smoothing capacitor between the output terminals of the full-wave rectifier circuit,
  switching means which is connected between the input terminal of the full-wave rectifier circuit and a connecting point between the boosting capacitors, and
  control means for controlling the switching means so as to perform a switching operation in response to change in the power voltage.

A converter of a second embodiment according to the present invention employs means which controls the switching means so as to perform a switching operation once for every half cycle of the power voltage, as the control means.

A converter of a third embodiment according to the present invention employs means which detects zero-cross of the power voltage and outputs a control signal for turning the switching means ON for a predetermined time period in response to the detection of the zero-cross, as the control means.

A converter of a fourth embodiment according to the present invention employs means which outputs a control signal for turning the switching means ON for a predetermined time period which includes a zero-cross timing of the power voltage therein, as the control means.

A converter of a fifth embodiment according to the present invention employs means which outputs a control signal for turning the switching means ON for a predetermined time period, center timing of which is coincident to a zero-cross timing of the power voltage, as the control means.

A converter of a sixth embodiment according to the present invention employs means for outputting a control signal for turning the switching means ON for a predetermined time period which is determined to include a zero-cross timing of the power voltage and is determined so that its advance phase side time period is shorter than its delay phase side time period, both time periods being determined with respect to the zero-cross timing, as the control means.

A converter of a seventh embodiment according to the present invention employs means which outputs a control signal for turning the switching means ON for a previously determined time period, as the control means.

A converter of an eighth embodiment according to the present invention employs means which compares a DC voltage supplied to a load and a DC voltage command value given from the exterior, and outputs a control signal for turning the switching means ON for a predetermined time period which approaches the DC voltage to the DC voltage command value, as the control means.

A converter of a ninth embodiment according to the present invention comprises, reactors,
- a three phase full-wave rectifier circuit having input terminals and output terminals which circuit is connected to a three phase power source through the reactors,
- smoothing capacitors connected in series to one another and connected between the output terminals of the three phase full-wave rectifier circuity,
- switching means each of which is connected between the input terminal of each phase of the three phase full-wave rectifier circuit and a connecting point between the smoothing capacitors, and
- control means for controlling the switching means so as to perform a switching operation in response to a change in the power voltage and/or a change in load.

A converter of a tenth embodiment according to the present invention comprises, reactors,
- a three phase full-wave rectifier circuit having input terminals and output terminals which circuit is connected to a three phase power source through the reactors,
- boosting capacitors connected in series to one another and connected between the output terminals of the three phase full-wave rectifier circuit,
- a smoothing capacitor connected in parallel to the boosting capacitors, the smoothing capacitor having a capacitance which is greater than the capacitance of the boosting capacitors,
- switching means each of which is connected between the input terminal of each phase of the three phase full-wave rectifier circuit and a connecting point between the boosting capacitors, and
- control means for controlling the switching means so as to perform a switching operation in response to a change in the power voltage and/or a change in load.

A converter of an eleventh embodiment according to the present invention employs means which controls the switching means so as to perform a switching operation once for every half cycle of the power voltage, as the control means.

A converter of a twelfth embodiment according to the present invention employs means which determines an ON-time period of the switching means so as to remove or reduce specific harmonic components, as the control means.

A converter of a thirteenth embodiment according to the present invention employs means which detects load information and determines a timing for turning the switching means ON in response to the detection value, as the control means.

A converter of a fourteenth embodiment according to the present invention employs means which determines an ON-time period of the switching means and a timing for turning the switching means ON so that a fundamental wave of an input current and the power voltage are in the same phase to one another.

A converter of a fifteenth embodiment according to the present invention employs means which detects a DC voltage, calculates a difference between the detected DC voltage and a DC voltage command value, and determines an ON-time period of the switching means in response to the calculated difference.

When the converter of the first embodiment according to the present invention is employed, the converter comprises the reactor, the full-wave rectifier circuit having input terminals and output terminals which circuitry is connected to an AC power source through the reactor, the smoothing capacitor which is connected between the output terminals of the full-wave rectifier circuit, the boosting capacitors connected in series to one another which is connected in parallel to the smoothing capacitor between the output terminals of the full-wave rectifier circuit, the switching means which is connected between the input terminal of the full-wave rectifier circuit and a connecting point between the boosting capacitors, and the control means for controlling the switching means so as to perform a switching operation in response to a change in the power voltage. Therefore, voltage doubler rectification and full-wave rectification can be changed from one another in response to the change in the power voltage. And, stepping up of the DC voltage is easily realized within a range which is greater than a voltage obtained by the full-wave rectification and is smaller than a voltage obtained by the voltage doubler rectification. Further, a high power factor is realized similarly to that of a power factor improvement converter using a boosting chopper. The control of switching is extremely simple, and noises flowing out to the power source system do not matter, so that increase in cost is greatly suppressed. Of course, reduction of harmonics is realized.

When the converter of the second embodiment according to the present invention is employed, the converter employs the means which controls the switching means so as to perform a switching operation once for every half cycle of the power voltage, as the control means. Therefore, the control of switching is simplified more in addition to the operation and effects of the first embodiment.

When the converter of the third embodiment according to the present invention is employed, the converter employs the means which detects zero-cross of the power voltage and outputs the control signal for turning the switching means ON for the predetermined time period in response to the detection of the zero-cross, as the control means. Therefore, an advance phase side conduction angle enlarging effect due to the voltage doubler rectification and delay phase side conduction angle enlarging effect due to the full-wave rectification are effectively used so that great improvement in power factor and great improvement in harmonics are realized.

When the converter of the fourth embodiment according to the present invention is employed, the converter employs the means which outputs the control signal for turning the switching means ON for the predetermined time period which includes the zero-cross timing of the power voltage therein, as the control means. Therefore, the power factor improvement effect and the harmonics improvement effect are obtained.

When the converter of the fifth embodiment according to the present invention is employed, the converter employs the means which outputs the control signal for turning the switching means ON for the predetermined time period center timing of which is coincident to the zero-cross timing of the power voltage, as the control means. Therefore, the power factor improvement effect and the harmonics improvement effect are raised.

When the converter of the sixth embodiment according to the present invention is employed, the converter employs the means for outputting the control signal for turning the switching means ON for the predetermined time period which is determined to include the zero-cross timing of the power voltage and is determined so that its advance phase side time period is shorter than its delay phase side time period, both time periods being determined with respect to the zero-cross timing, as the control means. Therefore, the power factor improvement effect is raised and the harmonics improvement effect is raised more.

When the converter of the seventh embodiment according to the present invention is employed, the converter employs the means which outputs the control signal for turning the switching means ON for the previously determined time period, as the control means. Therefore, operations and effects are realized which are similar to those of one of the first through sixth embodiments.

When the converter of the eighth embodiment according to the present invention is employed, the converter employs the means which compares the DC voltage supplied to the load and the DC voltage command value given from the exterior, and outputs the control signal for turning the switching means ON for the predetermined time period which approaches the DC voltage to the DC voltage command value, as the control means. Therefore, a DC voltage can be output therefrom which is required in downstream side circuitry with respect to the converter, in addition to the operations and effects of one of the first through sixth embodiments.

When the converter of the ninth embodiment according to the present invention is employed, the converter comprises the reactors, the three phase full-wave rectifier circuit having input terminals and output terminals which circuitry is connected to the three phase power source through the reactors, the smoothing capacitors connected in series to one another which are connected between the output terminals of the three phase full-wave rectifier circuit, the switching means each of which is connected between the input terminal of each phase of the three phase full-wave rectifier circuit and the connecting point between the smoothing capacitors, and the control means for controlling the switching means so as to perform a switching operation in response to a change in the power voltage and/or a change in load. Therefore, stepping up of the DC voltage is easily realized within a range which is greater than a voltage obtained by the full-wave rectification and is smaller than a voltage obtained by the voltage doubler rectification. Further, a high power factor is realized similarly to that of a power factor improvement converter using a boosting chopper. The control of switching is extremely simple, and noises flowing out to the power source system do not matter, so that increase in cost is greatly suppressed. Of course, reduction of harmonics is realized.

When the converter of the tenth embodiment according to the present invention is employed, the converter comprises the reactors, the three phase full-wave rectifier circuit having input terminals and output terminals which circuitry is connected to the three phase power source through the reactors, the boosting capacitors connected in series to one another which are connected between the output terminals of the three phase full-wave rectifier circuit, the smoothing capacitor connected in parallel to the boosting capacitors, the smoothing capacitor having capacitance which is greater than the capacitance of the boosting capacitors, the switching means each of which is connected between the input terminal of each phase of the three phase full-wave rectifier circuit and the connecting point between the boosting capacitors, and the control means for controlling the switching means so as to perform a switching operation in response to a change in the power voltage and/or a change in load. Therefore, higher harmonics components in the input current are reduced. And, stepping up of the DC voltage is easily realized within a range which is greater than a voltage obtained by the full-wave rectification and is smaller than a voltage obtained by the voltage doubler rectification. Further, a high power factor is realized similarly to that of a power factor improvement converter using a boosting chopper. The control of switching is extremely simple, and noises flowing out to the power source system do not matter, so that increase in cost is greatly suppressed. Of course, reduction of harmonics is realized.

When the converter of the eleventh embodiment according to the present invention is employed, the converter employs the means which controls the switching means so as to perform the switching operation once for every half cycle of the power voltage, as the control means. Therefore, the control of switching is simplified more in addition to the operation and effects of the ninth or tenth embodiment. Further, the converter performs the switching operation once for every half cycle of the power voltage so that disadvantages such that lowering in efficiency due to high frequency switching in a PWM converter, increase in noises, increase in leak current and increase in cost are improved.

When the converter of the twelfth embodiment according to the present invention is employed, the converter employs the means which determines the ON-time period of the switching means so as to remove or reduce specific harmonics components, as the control means. Therefore, the specific harmonics components can be removed or reduced, and operations and effects are realized which are similar to those of one of the ninth through eleventh embodiments.

When the converter of the thirteenth embodiment according to the present invention is employed, the converter employs the means which detects load information and determines the timing for turning the switching means ON in response to the detection value, as the control means. Therefore, specific harmonics components can be removed or reduced, and operations and effects are realized which are similar to those of the twelfth embodiment.

When the converter of the fourteenth embodiment according to the present invention is employed, the converter employs the means which determines the ON-time period of the switching means and the timing for turning the switching means ON so that the fundamental wave of the input current and the power voltage are in the same phase to one another. Therefore, the fundamental wave power factor of the input current is always maintained to be 1, and operations and effects are realized which are similar to those of one of the ninth through thirteenth embodiments.

When the converter of the fifteenth embodiment according to the present invention is employed, the converter employs the means which detects the DC voltage, calculates the difference between the detected DC voltage and the DC voltage command value, and determines the ON-time period of the switching means in response to the calculated difference. Therefore, a stable DC voltage can be supplied despite the change in the power voltage and the change in the load, and operations and effects are realized which are similar to those of one of the ninth through eleventh embodiments.

BEST MODE FOR CARRYING OUT THE INVENTION

Hereinafter, referring to the attached drawings, we explain embodiments according to the present invention in detail.

Figure 5:
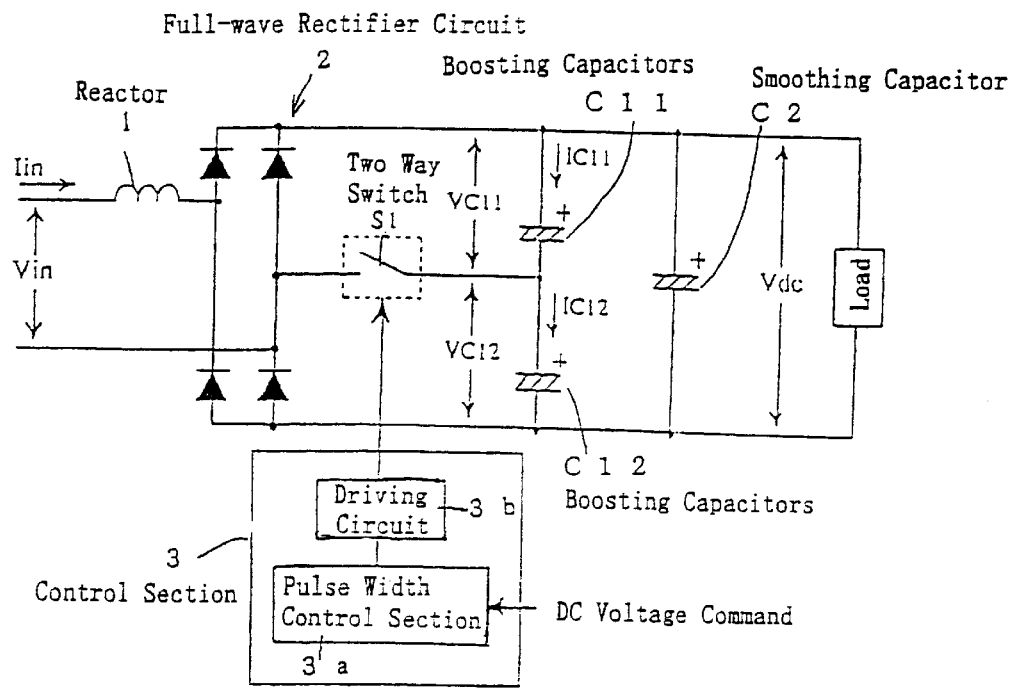
FIG. 5 is a diagram illustrating a converter of a first embodiment according to the present invention.

FIG. 5 is an electric circuit diagram illustrating a converter of a first embodiment according to the present invention.

In this converter, a full-wave rectifier circuit 2 is connected between terminals of an AC power source (not illustrated) through a reactor 1. A smoothing capacitor C2 is connected between the output terminals of the full-wave rectifier circuit 2. Boosting capacitors (voltage doubler capacitors) C11 and C12 connected in series to one another are connected between the output terminals of the full-wave rectifier circuit 2 in parallel to the smoothing capacitor C2, the boosting capacitors C11 and C12 having the same capacitance. A two way switch S1 is connected between the input terminal of the full-wave rectifier circuit 2 and the connecting point between the boosting capacitors C11 and C12. And, a control section 3 is provided which controls the two way switch S1 so as to perform switching once for every half cycle of the power voltage.

The control section 3 comprises a pulse width control section 3a for outputting a pulse signal having a pulse width which corresponds to a DC voltage command value given from the exterior, and a driving circuit 3b for inputting the pulse signal output from the pulse width control section 3a and for outputting a driving signal for driving the two way switch S1. The pulse signal output from the pulse width control section 3a is a signal for performing switching of the two way switch S1 once for every half cycle of the power voltage.

When the converter of the first embodiment is employed, the two way switch S1 can be switched once for every half cycle of the power voltage. And, voltage doubler rectification is performed during an ON-time period of the two way switch S1, while full-wave rectification is performed during an OFF-time period of the two way switch S1. The DC voltage obtained by the voltage doubler rectification or the DC voltage obtained by the full-wave rectification is not supplied to a load as it is, but is supplied under smoothened condition by the smoothing capacitor C2. Therefore, stepping up of the DC voltage is easily realized within a range which is equal to or more than a voltage obtained by the full-wave rectification and is less than a voltage obtained by the voltage doubler rectification. Further, a high power factor is realized similarly to that of a power factor improvement converter using a boosting chopper. The control of switching is extremely simple, and noises flowing out to the power source system do not matter, so that increase in cost is greatly suppressed. Of course, reduction of harmonics is realized.

In this embodiment, the two way switch S1 is connected between the input terminal of the full-wave rectifier circuit 2 and the connecting point between the boosting capacitors C11 and C12, the input terminal being connected to the power source without interposing the reactor 1. But, the two way switch S1 may be connected between the other input terminal of the full-wave rectifier circuit 2 and the connecting point between the boosting capacitors C11 and C12, so that operations and effects can be realized which are similar to those of the above arrangement.

Figure 6:
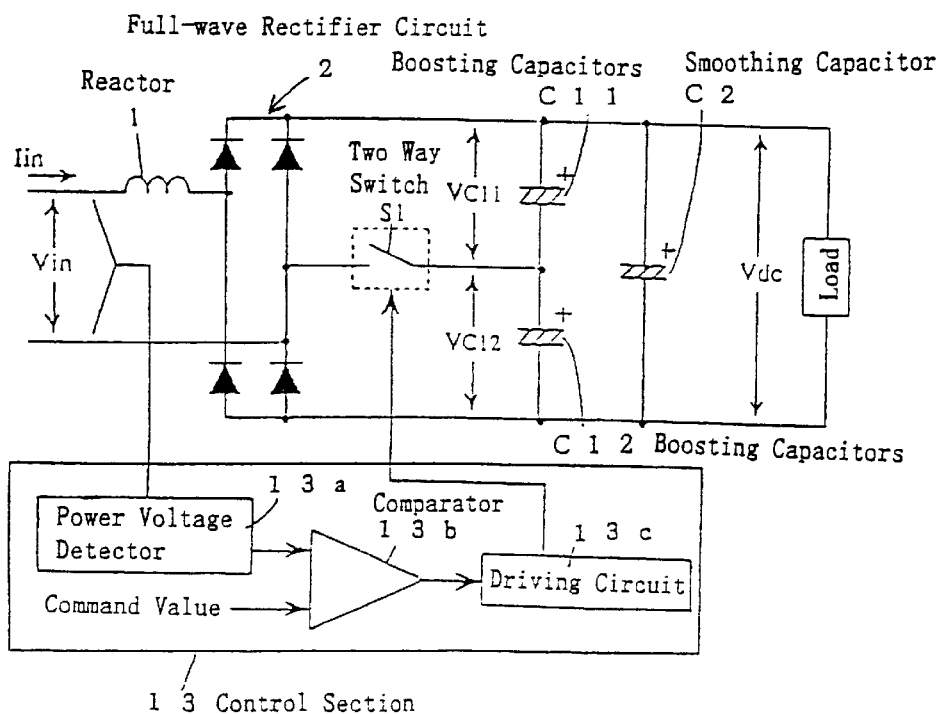
FIG. 6 is a diagram illustrating a converter of a second embodiment according to the present invention.
Figure 7:
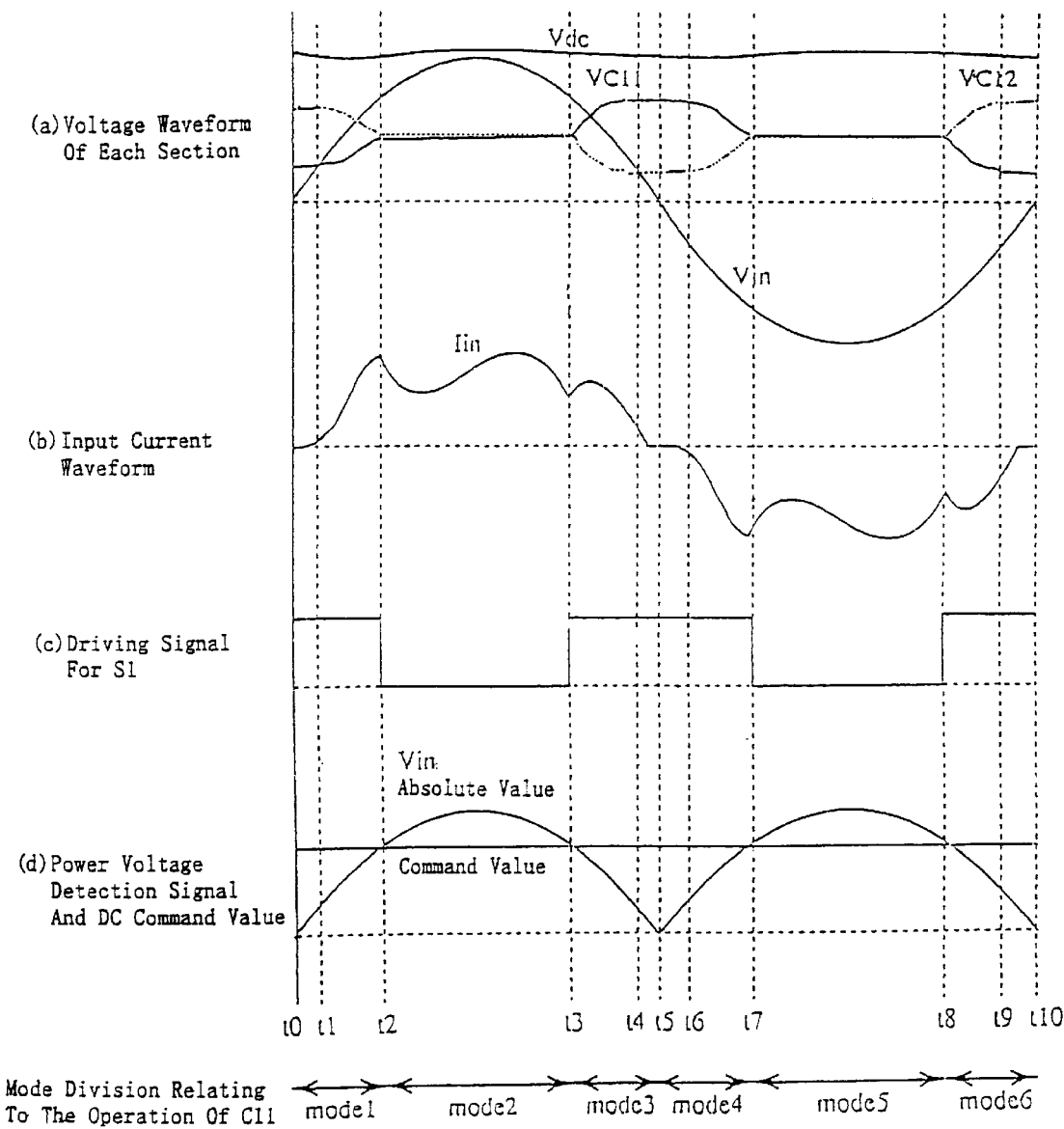
FIGS. 7(a) through 7(d) are diagrams illustrating waveforms of each section of the converter of FIG. 6.

FIG. 6 is a diagram illustrating a converter of a second embodiment according to the present invention.

In this converter, a full-wave rectifier circuit 2 is connected between terminals of the power source (not illustrated) through a reactor 1. A smoothing capacitor C2 is connected between the output terminals of the full-wave rectifier circuit 2. Boosting capacitors (voltage doubler capacitors) C11 and C12 connected in series to one another are connected between the output terminals of the full-wave rectifier circuit 2 in parallel to the smoothing capacitor C2, the boosting capacitors C11 and C12 having the same capacitance. A two way switch S1 is connected between the input terminal of the full-wave rectifier circuit 2 and the connecting point between the boosting capacitors C11 and C12. And, a control section 13 is provided which controls the two way switch S1 so as to perform switching once for every half cycle of the power voltage.

The control section 13 comprises a power voltage detector 13a for detecting a power voltage of the AC power source, a comparator 13b for comparing a size of a DC voltage command value given from the exterior and the detected power voltage and for outputting a comparison result signal, and a driving circuit 13c for inputting the comparison result signal output from the comparator 13b and for outputting a driving signal for driving the two way switch S1. Specifically, the two way switch S1 is controlled to turn ON when the DC voltage command value is greater than the detected power voltage. Therefore, the switching is performed once for every half cycle of the power voltage by determining the timing to be a starting point, the timing being a timing when the DC voltage command value exceeds the detected power voltage, for example.

Operation of the converter of the second embodiment is described in detail by referring to waveform diagrams illustrated in FIGS. 7(a) through 7(d). When the converter is in a steady-state, the boosting capacitors C11 and C12 maintain electric charges at an initial stage {refer to time t0 in FIGS. 7(a) through 7(d)}, the electric charges being charged during a previous one cycle. Therefore, the boosting capacitors C11 and C12 have a constant potential. In the following, operations of each mode illustrated in FIGS. 7(a) through 7(d) are described. In the description, operation of the boosting capacitor C11 is mainly described.

Mode 1 (from time t0 to time t2)

The two way switch S1 has already been turned ON at the initial stage t0, and the converter circuit is performing the voltage doubler rectification. The boosting capacitor C11 is further charged from the initial condition until the two way switch S1 turns OFF so that the voltage between both terminals of the boosting capacitor C11 is increased {refer to VC11 in FIG. 7(a)}. During this time period, a capacitor charging current IC11 flows so that a conduction angle of the input current is enlarged by the charging current (actually, a combined current combined with a discharging current of the boosting capacitor C12 in mode 4) of the boosting capacitor C11. Actually, the input current starts conducting from a time earlier from the timing t1 due to the energy charged in the reactor 1 during the previous half cycle so that the conduction angle is greatly enlarged, the timing t1 being a timing when the potential of the boosting capacitor C11 becomes smaller than the input voltage.

Mode 2 (from time t2 to time t3)

The two way switch S1 turns OFF after a predetermined time has passed (time t2), and the converter changes its operation to full-wave rectification operation. And, the potential of the boosting capacitor C11 is held until the next voltage doubler rectification operation (turning ON of the two way switch S1).

Mode 3 (from time t3 to time t5)

The two way switch S1 turns ON after a predetermined time has passed (time t3), and the converter changes its operation to voltage doubler rectification operation. The boosting capacitor C11 is further charged until the potential of the boosting capacitor C12 becomes greater than the input voltage. Therefore, the voltage between both terminals of the boosting capacitor C11 is increased. During this time period, a capacitor charging current IC11 flows so that the input current is enlarged in its delay phase angle more than that of full-wave rectification operation by the charging current (actually, a combined current combined with a discharging current of the boosting capacitor C12 in mode 6) of the boosting capacitor C11. Further, falling of the current is delayed by the charged energy of the reactor 1 so that the conduction angle is further enlarged.

Mode 4 (from time t5 to time t7)

The next half cycle (the half cycle when the power voltage is negative) is entered, the potential of the boosting capacitor C12 becomes lower than the absolute value of the power voltage so that the boosting capacitor C12 starts charging (time t6), while the boosting capacitor C11 starts discharging. The boosting capacitor C11 continues discharging until the two way switch S1 is turned OFF (time t7). The input current starts conducting from an earlier time due to the discharging current (actually, a combined current combined with a charging current of the boosting capacitor C12 in mode 1) of the boosting capacitor C11. Therefore, the conduction angle is enlarged. Further, the conduction angle at the falling of the current is further enlarged by the conduction angle enlarging effect due to the reactor 1 as is similar to the mode 1.

Mode 5 (from time t7 to time t8)

The two way switch S1 turns OFF, and the converter changes its operation to the full-wave rectification. Therefore, the boosting capacitor C11 assumes a non-conduction condition, and the input current directly charges the boosting capacitor C12. Of course, the potential of the boosting capacitor C11 is held until the next voltage doubler rectification operation (turning ON of the two way switch S1).

Mode 6 (from time t8 to time t10)

The two way switch S1 turns ON, and the boosting capacitor C11 is further discharged until the potential of the boosting capacitor C11 becomes equal to the absolute value of the power voltage (time t9). The input current is enlarged in its delay phase angle more than that of the full-wave rectification operation by the charging current (actually, a combined current combined with a discharging current of the boosting capacitor C12 in mode 3) of the boosting capacitor C11. Actually, falling of the input current is delayed by the charged energy of the reactor 1 so that the conduction angle is further enlarged and the conducting angle at the falling is further enlarged. When the boosting capacitor C11 has finished its discharging, the potential of the boosting capacitor C11 is returned to its initial value and the operation is returned to mode 1.

The boosting capacitor C12 has a capacitance which is the same as the capacitance of the boosting capacitor C11, as is similar to the arrangement of the voltage doubler rectifier circuit. Therefore, the boosting capacitor C12 performs operations which are similar to the above operation with a delay of a half cycle.

Figure 8:
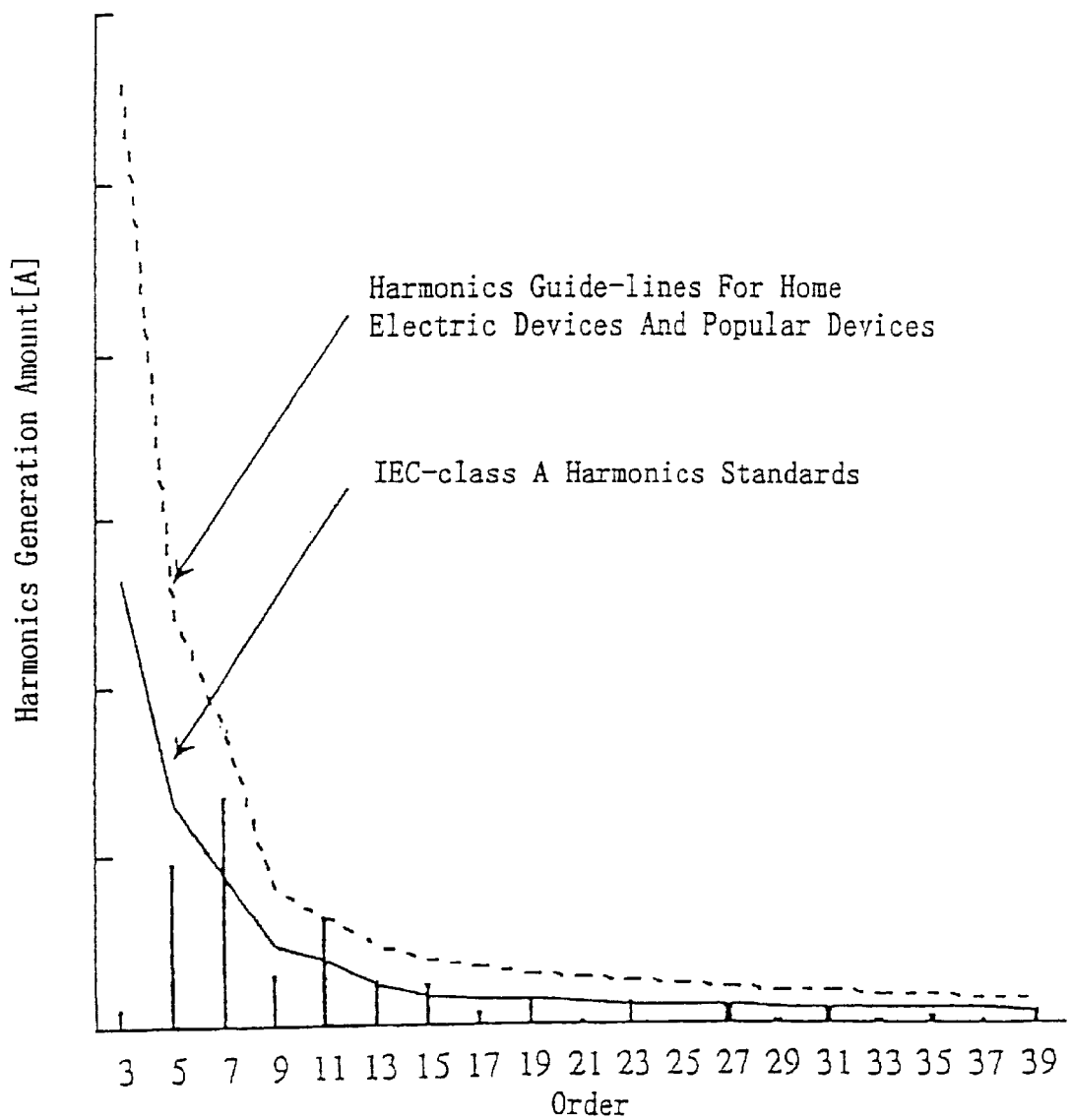
FIG. 8 is a diagram illustrating relationships between harmonics generation amounts of the converter of FIG. 6, harmonics guide-lines for home electric devices and popular devices, and IEC-class A harmonics standards.

Summarizing the above, stepping up of the DC voltage Vdc is realized by operating the boosting capacitor C11 (the boosting capacitor C12) in a voltage doubler operation so as to charge the electric charge which is greater than the electric charge charged by the full-wave rectification operation. The DC voltage Vdc can be arbitrarily controlled within the range by the ON-time period of the two way switch S1 which range is greater than the full-wave rectification output voltage and is smaller than the voltage doubler rectification output voltage. Therefore, the DC voltage Vdc is easily stepped up by lengthening the ON-time period of the two way switch S1 when the load is heavy and the DC voltage is lowered. On the contrary, the DC voltage Vdc is easily suppressed from increasing too much by shortening the ON-time period of the two way switch S1 when the load is light for increasing the DC voltage. When the converter is a measure to counter harmonics, the ON-time period of the two way switch S1 is determined to be about 2 msec to 4 msec so that the charging currents and the discharging currents of the boosting capacitors C11 and C12 have a conducting angle enlarging effect in the advance phase side and the delay phase side. Therefore, the conducting angle is greatly enlarged so that a converter with high performance is realized which converter has a high power factor and small harmonics. FIG. 8 illustrates compatibility of the harmonics generation amount of the converter of this embodiment and the harmonics guide-line of home electric devices and popular devices. As is apparent from FIG. 8, the converter of this embodiment is a power source with small harmonics which is compatible to the harmonics guide-line of home electric devices and popular devices. Further, the input power of the converter of this embodiment is a high power factor of 97%.

The reactor 1 employed in the input side of the full-wave rectifier circuit 2 does not require great current smoothing force which reactor is different from a reactor employed in a conventional voltage doubler rectification system. Therefore, the above high performance is realized with the reactor of 8% through 9%.

Figure 1A:
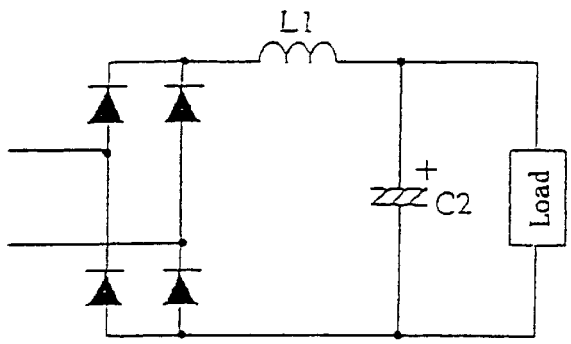
FIG. 1(a) is an electric circuit diagram illustrating an example of a conventional converter.
Figure 1B:
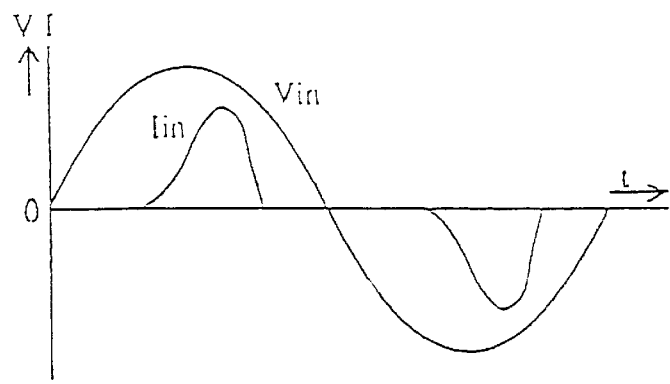
FIG. 1(b) is a diagram illustrating an input voltage waveform and an input current waveform.
Figure 1C:
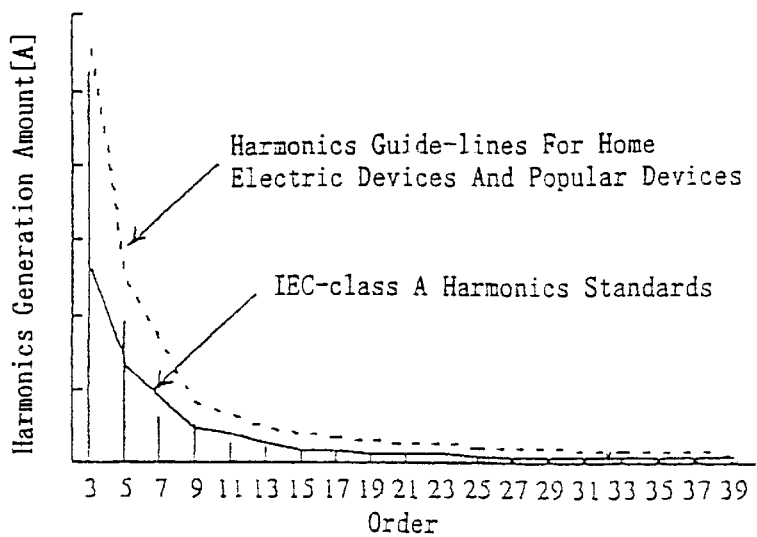
FIG. 1(c) is a diagram illustrating relationships between harmonics generation amounts, harmonics guide-lines for home electric devices and popular devices, and IEC-class A harmonics standards.
Figure 2A:
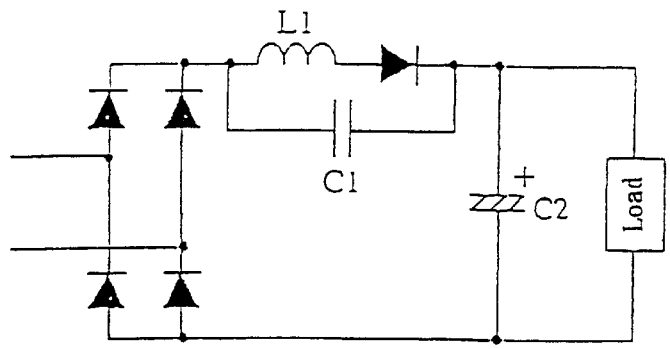
FIG. 2(a) is an electric circuit diagram illustrating another example of a conventional converter.
Figure 2B:
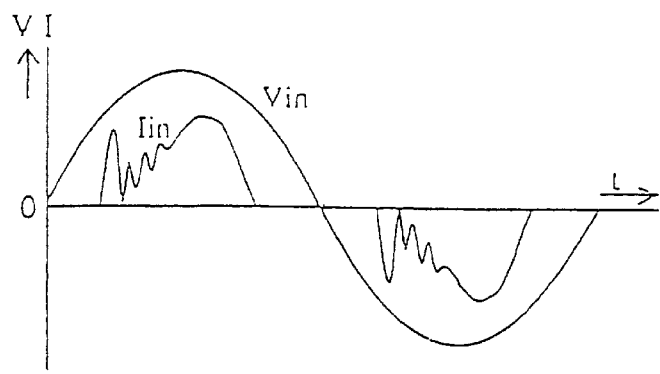
FIG. 2(b) is a diagram illustrating an input voltage waveform and an input current waveform.
Figure 2C:
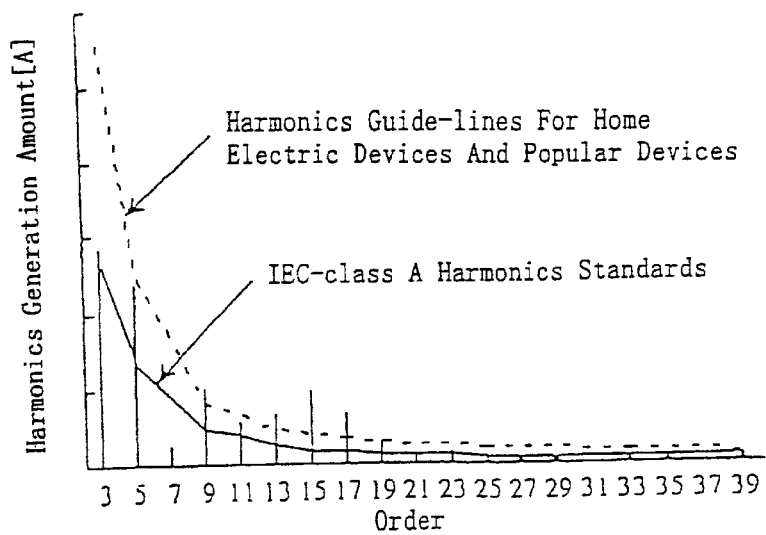
FIG. 2(c) is a diagram illustrating relationships between harmonics generation amounts, harmonics guide-lines for home electric devices and popular devices, and IEC-class A harmonics standards.
Figure 3A:
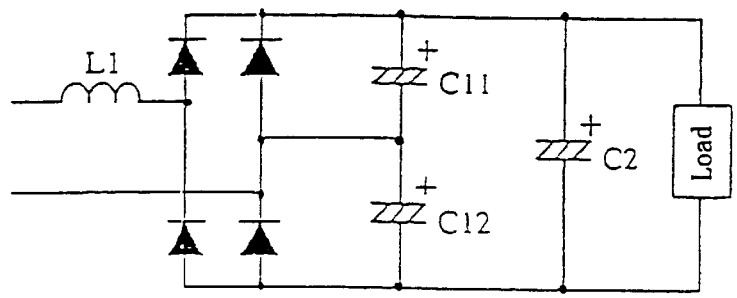
FIG. 3(a) is an electric circuit diagram illustrating a further example of a conventional converter.
Figure 3B:
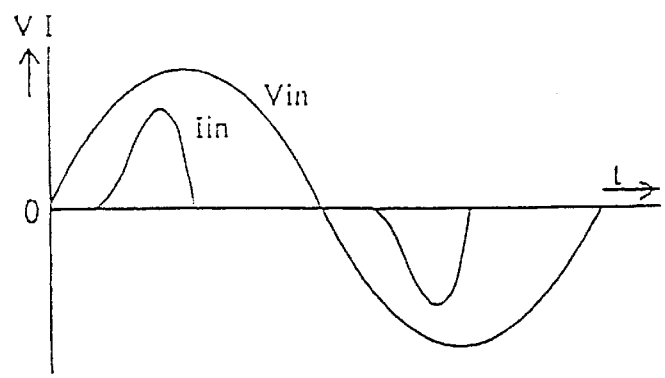
FIG. 3(b) is a diagram illustrating an input voltage waveform and an input current waveform.
Figure 4A:
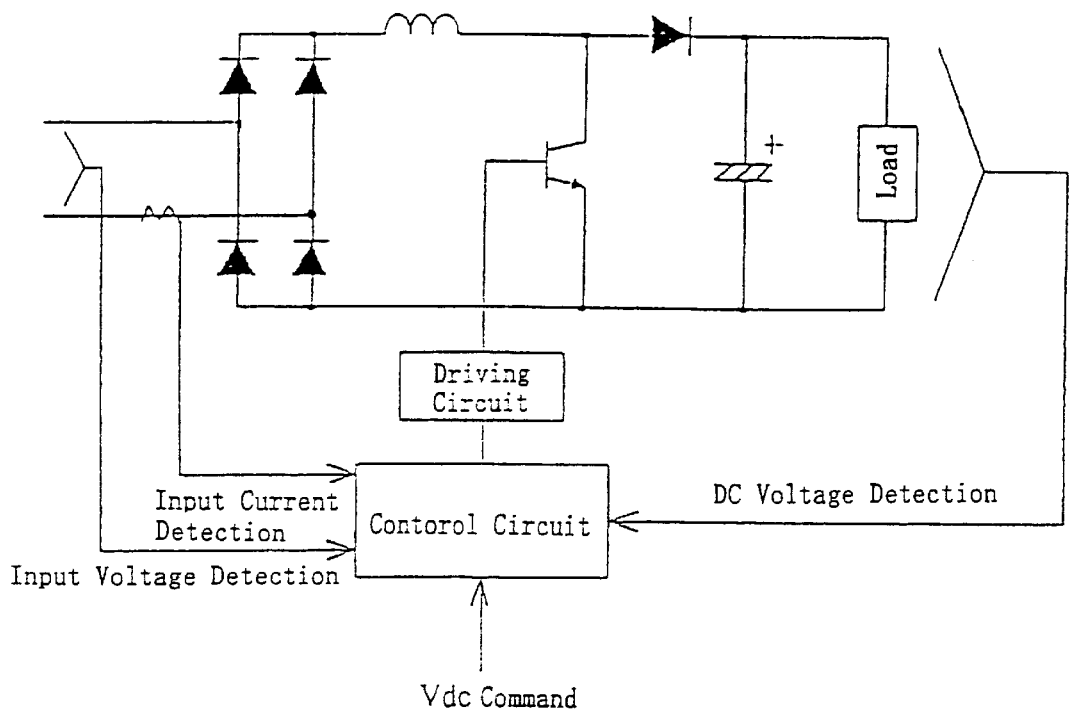
FIG. 4(a) is an electric circuit diagram illustrating yet another example of a conventional converter.
Figure 4B:
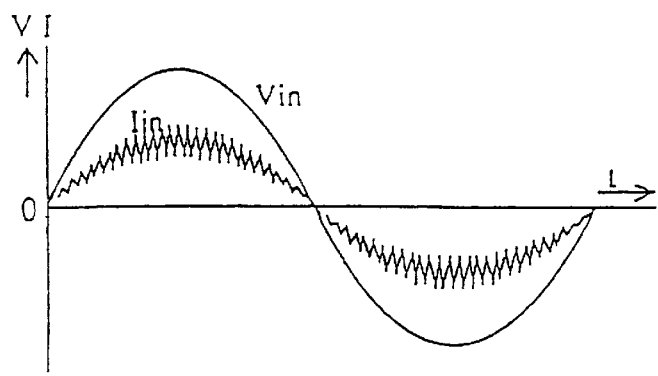
FIG. 4(b) is a diagram illustrating an input voltage waveform and an input current waveform.

Further, the switching is simple switching which performs switching once for every half cycle. Therefore, the control section 13 is simplified in its circuitry arrangement and is decreased in cost. And, noise generation due to carrier and the like is prevented from occurring which noise generation was the problem in the power factor improvement converter using a boosting chopper as is illustrated in FIG. 4. Further, harmonics ripple components of current due to high frequency switching do not flow through the reactor 1, so that harmonics losses of the reactor 1 are reduced and the converter efficiency is improved with respect to a power factor improvement converter using a boosting chopper illustrated in FIG. 4.

Figure 9:
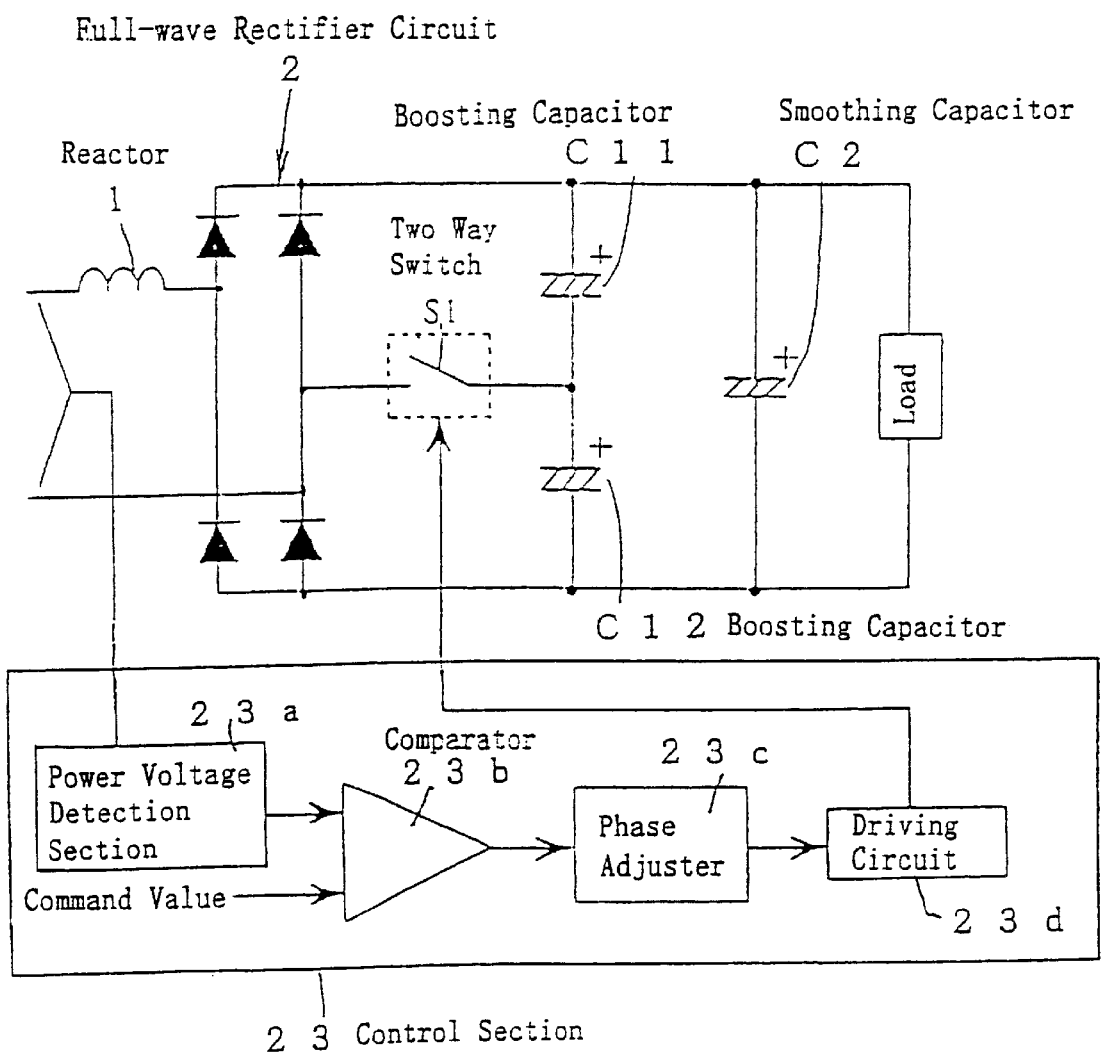
FIG. 9 is a diagram illustrating a converter of a third embodiment according to the present invention.
Figure 10:
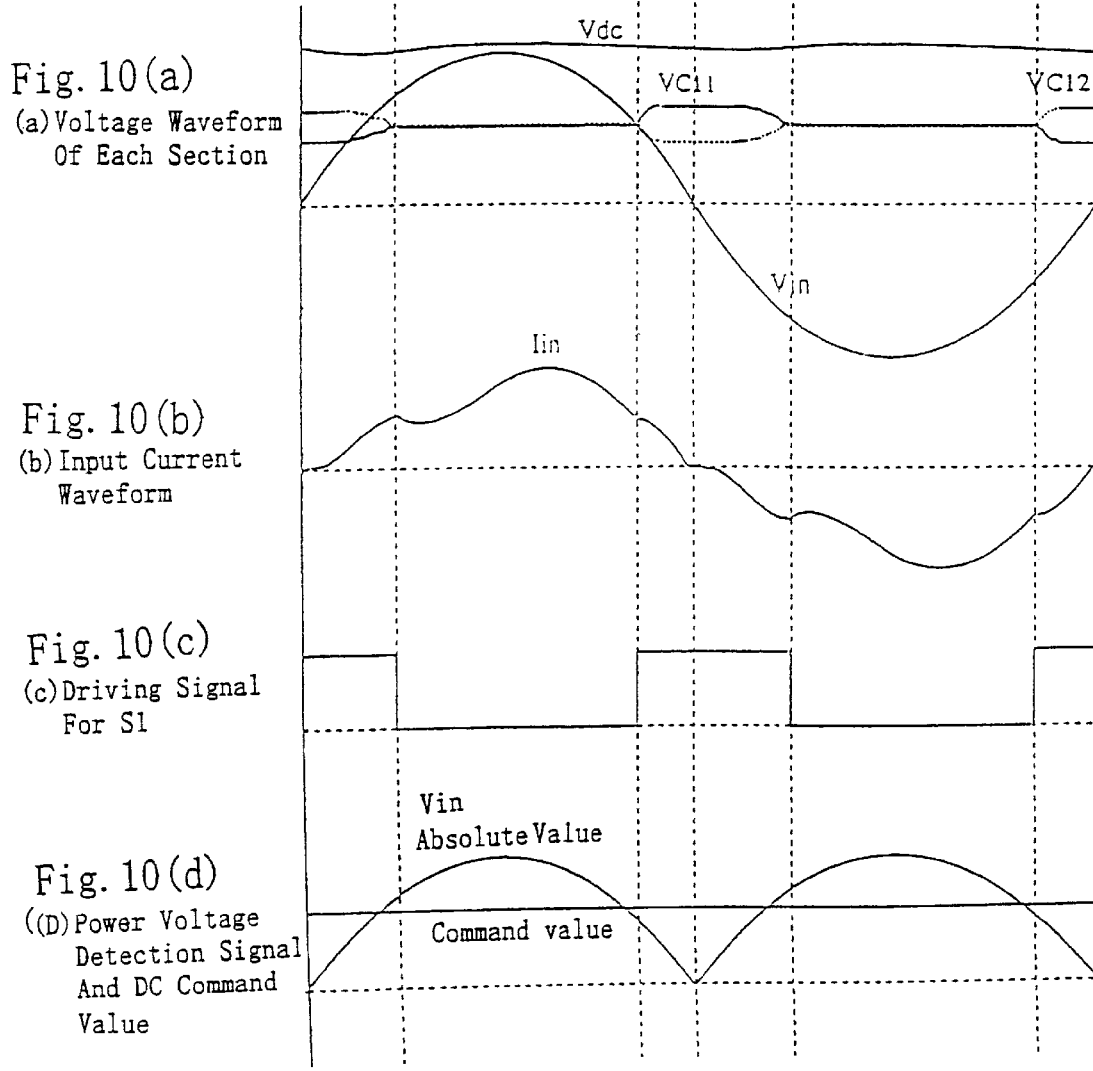
FIGS. 10(a) through 10(d) are diagrams illustrating waveforms of each section of the converter of FIG. 9.

FIG. 9 is a diagram illustrating a converter of a third embodiment according to the present invention.

In this converter, a full-wave rectifier circuit 2 is connected between terminals of the power source (not illustrated) through a reactor 1. A smoothing capacitor C2 is connected between the output terminals of the full-wave rectifier circuit 2. Boosting capacitors (voltage doubler capacitors) C11 and C12 connected in series to one another are connected between the output terminals of the full-wave rectifier circuit 2 in parallel to the smoothing capacitor C2, the boosting capacitors C11 and C12 having the same capacitance to one another. A two way switch S1 is connected between the input terminal of the full-wave rectifier circuit 2 and the connecting point between the boosting capacitors C11 and C12. And, a control section 23 for controlling the two way switch S1 so as to perform switching once for every half cycle of the power voltage.

The control section 23 comprises a power voltage detection section 23a for detecting a power voltage of an AC power source (not illustrated), a comparator 23b for comparing a DC voltage command value given from the exterior and the detected power voltage in their sizes and for outputting a comparison result signal, a phase adjuster 23c for inputting the comparison result signal from the comparator 23b and for adjusting a phase so as to shorten a time period in advance phase side with respect to a zero-cross point of the power voltage, and a driving circuit 23d for inputting the output signal from the phase adjuster 23c and for outputting a driving signal for driving the two way switch S1. Specifically, this embodiment never changes the length of the time period for turning the two way switch S1 ON, shortens the time period in the advance phase side with respect to the zero-cross point of the power voltage, and lengthens the time period in the delay phase side with respect to the zero-cross point of the power voltage, while the embodiment of FIG. 6 controls the two way switch S1 to turn ON for the time period which is in synchronism with respect to the zero-cross point of the power voltage which point is at the center of the time period. Therefore, the switching of the two way switch S1 is performed once for every half cycle of the power voltage which cycle is determined in its starting point to be a first timing which is determined by applying the phase adjusting based upon a second timing when the DC voltage command value exceeds the detected power voltage, for example.

Figure 11:
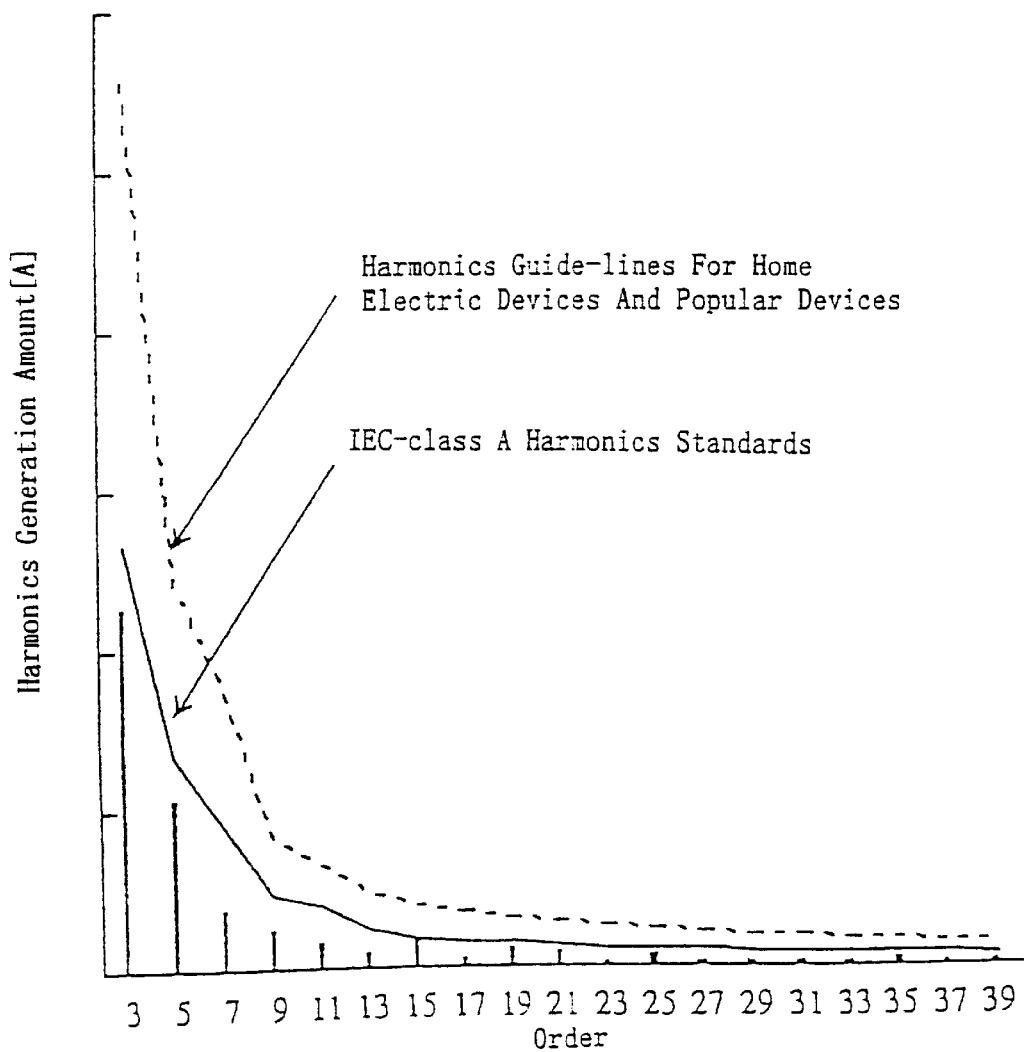
FIG. 11 is a diagram illustrating relationships between harmonics generation amounts of the converter of FIG. 9, harmonics guide-lines for home electric devices and popular devices, and IEC-class A harmonics standards.

When this embodiment is employed, the charging and discharging operations of the voltage doubler current are lightened by properly shortening the time period in the advance phase side with respect to the zero-cross point of the power voltage, the time period being a part of the ON signal of the two way switch S1. Therefore, the peak of the input current is greatly reduced so that a good current waveform is obtained which has little ripple. FIGS. 10(a) through 10(d) illustrate waveforms of each section when the two way switch S1 is controlled by employing this embodiment. As is apparent from FIGS. 10(a) through 10(d), it is understood that the input current has a good current waveform which has little ripple and has scarce current peak due to the voltage doubler current. Further, FIG. 11 illustrates harmonics generation amount when the two way switch S1 is controlled by employing this embodiment. As is apparent from FIG. 11, it is understood that the lower harmonics are greatly reduced in comparison to FIG. 8 and that a high-fidelity converter is realized which satisfies the harmonics standard values of IEC-class A which is a greatly severe standard in comparison to the harmonics guide-lines for home electric devices and popular devices. Further, the input power factor of this embodiment is a high power factor of 92% which is lower to some degree with respect to the input power factor of the embodiment illustrated in FIG. 6 because the phase of the fundamental wave is delayed.

Description is made in more detail.

When the two way switch S1 is controlled by the embodiment of FIG. 6, the control signal for the two way switch S1 becomes a pulse waveform which is in synchronism in right and left with respect to the zero-cross point of the power voltage which is the center of the pulse waveform. When this controlling is employed, the full-wave rectification current (mode 2 and mode 5 in FIG. 7) is delayed with respect to the power voltage by the reactor 1 so that the current ripple at the changing point between the voltage doubler rectification and the full-wave rectification is increased and that the reducing force for reducing the harmonics is weakened due to the increase in the current ripple. As is understood from the waveforms illustrated in FIGS. 7(a) through 7(d), the current ripple is generated at the changing point between the voltage doubler rectification and the full-wave rectification, and it is understood that the increase in the harmonics components of the seventh order, thirteenth order and the like is caused, the harmonics components being found in the harmonics contribution illustrated in FIG. 8. Further, it is understood that the harmonics standard values of IEC-class A are not satisfied.

It is easily thought that the capacity of the reactor is increased for reducing the current ripple. But, great affect in reducing the current ripple is not expected when the capacity of the reactor is merely adjusted. The reason is as follows. The charged energy is different between the full-wave rectification and the voltage doubler rectification even when the reactors have the same capacity to one another. Unbalance is generated in peak suppression effect of the reactor between the full-wave rectification and the voltage doubler rectification. That is, the current peak suppression effect during the voltage doubler rectification operation due to the increase in the capacity of the reactor is smaller in comparison to the current peak suppression effect during the full-wave rectification operation so that the peak in the voltage doubler operation current is increased and that the increase in harmonics of medium orders due to the increase in the peak is caused.

But, when this embodiment is employed, the time period in the advance phase side of the ON signal of the two way switch S1 with respect to the zero-cross point is properly shortened so that the difference between the current peak suppression effect during the voltage doubler rectification operation and the current peak suppression effect during the full-wave rectification operation is reduced. Therefore, the current peak is greatly reduced as is described in the above description.

The control signal for the two way switch S1 according to this embodiment is realized by decreasing the level of the DC voltage command to some degree and by adjusting the phase of the control signal for the two way switch S1 using the phase adjuster, as is illustrated in FIG. 9, for example, so that the control section is simplified in its arrangement. Further, the capacity of the reactor becomes greater to some degree (for example, 12%) in comparison to the capacity of the reactor in the embodiment of FIG. 6 for suppressing the current ripple, but is sufficiently smaller than the capacity of the reactor in the voltage doubler rectification system. Of course, the control in the DC output voltage is realized by the DC voltage command.

Figure 12:
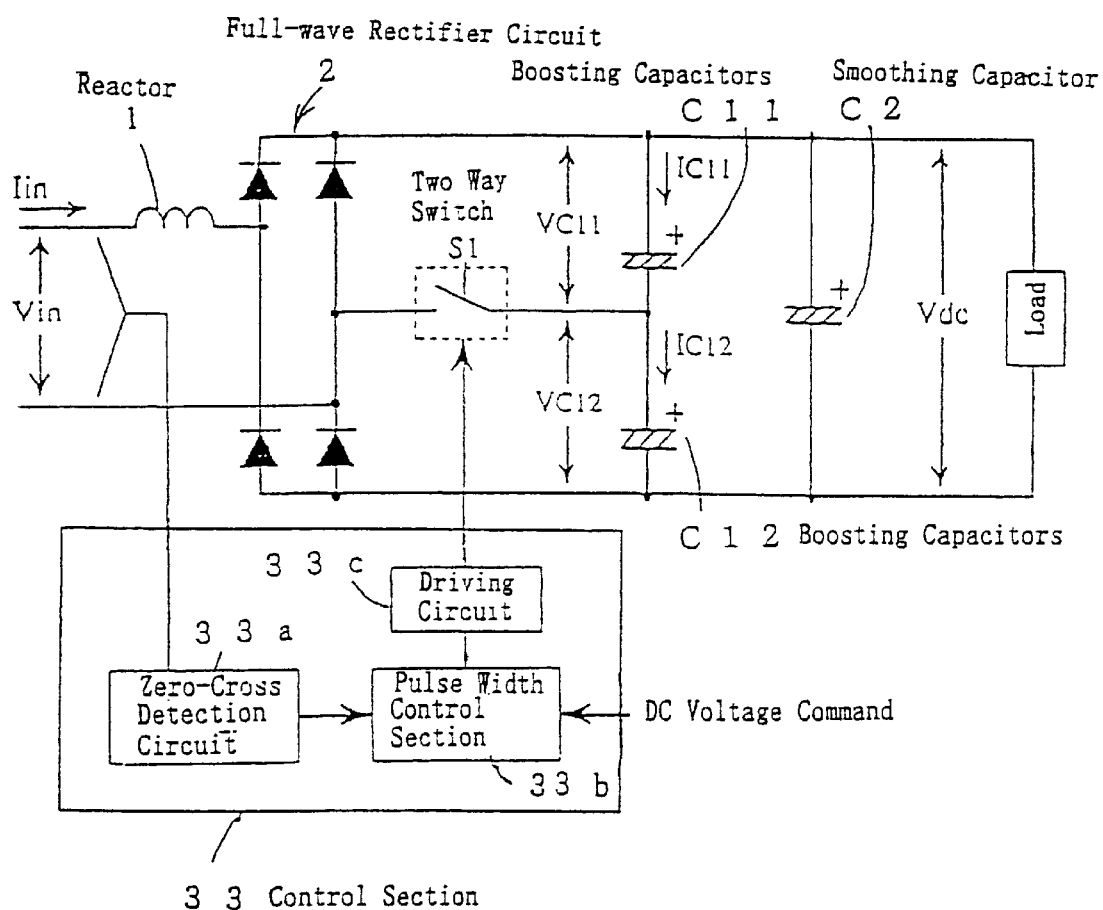
FIG. 12 is a diagram illustrating a converter of a fourth embodiment according to the present invention.
Figure 13:
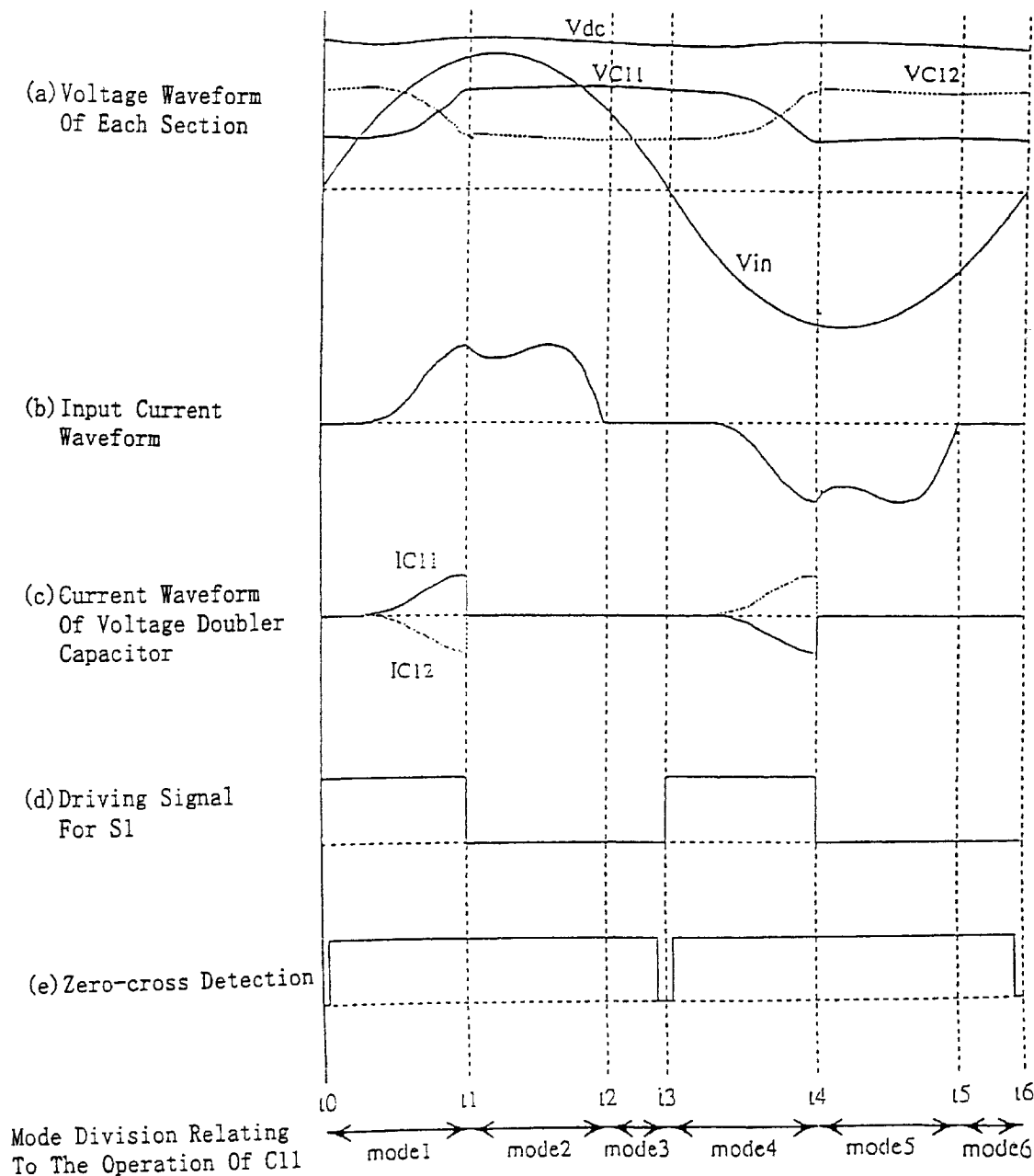
FIGS. 13(a) through 13(e) are diagrams illustrating waveforms of each section of the converter of FIG. 12.

FIG. 12 is a diagram illustrating a converter of a fourth embodiment according to the present invention.

In this converter, a full-wave rectifier circuit 2 is conneted between terminals of the power source (not illustrated) through a reactor 1. A smoothing capacitor C2 is connected between the output terminals of the full-wave rectifier circuit 2. Boosting capacitors (voltage doubler capacitors) C11 and C12 connected in series to one another are connected between the output terminals of the full-wave rectifier circuit 2 in parallel to the smoothing capacitor C2, the boosting capacitors C11 and C12 having the same capacitance to one another. A two way switch S1 is connected between the input terminal of the full-wave rectifier circuit 2 and the connecting point between the boosting capacitors C11 and C12. And, a control section 33 is provided which controls the two way switch S1 so as to perform switching once for every half cycle of the power voltage.

The control section 33 comprises a zero-cross detection circuit 33a for detecting a zero-cross of a power voltage, a pulse width control circuit 33b for inputting a DC voltage command value given from the exterior and the zero-cross detection signal and for outputting a pulse signal which rises by determining the zero-cross point of the power voltage as a starting point and falls at a timing which has been determined based upon passing of a time period corresponding to the DC voltage command value, and a driving circuit 33c for inputting the output signal from the pulse width control circuit 33b and for outputting a driving signal for driving the two way switch S1.

The operation and effect of the converter of this embodiment is described in detail by referring to the waveforms illustrated in FIGS. 13(a) through 13(e). When the converter is in a stable condition, the boosting capacitors C11 and C12 hold electric charge in the initial stage {refer to time t0 in FIGS. 13(a) through 13(e)}, the electric charge being charged during the previous one cycle. Therefore, the boosting capacitors C11 and C12 have a constant potential. In the following, operations of each mode illustrated in FIGS. 13(a) through 13(e) are described. In the description, operation of the boosting capacitor C11 is mainly described.

Mode 1 (from time t0 to time t1)

The two way switch S1 turns ON when the zero-cross of the power voltage is detected so that the converter starts the voltage doubler rectification operation. The boosting capacitor C11 is further charged from the initial condition until the two way switch S1 turns OFF so that the voltage between both terminals of the boosting capacitor C11 is raised {refer to VC11 in FIG. 13(a)}. During this time period, a capacitor charging current IC11 flows so that the input current starts conduction in earlier time by the charging current (actually, a combined current combined with a discharging current of the boosting capacitor C12 in mode 4) of the boosting capacitor C11.

Mode 2 (from time t1 to time t2)

The two way switch S1 turns OFF after a predetermined time has passed (time t1), and the converter changes its operation to the full-wave rectification operation. And, the potential of the boosting capacitor C11 is held until the next voltage doubler rectification operation (turning ON of the boosting capacitor C11). The input current directly charges the smoothing capacitor C2 and the conduction angle in the delay phase side is enlarged by the reactor 1.

Mode 3 (from time t2 to time t3)

When the smoothing capacitor C2 has finished its changing (time t2), the input current assumes a non-conduction condition so that the converter enters a stop period until the detection of the next zero-cross detection signal of the power voltage.

Mode 4 (from time t3 to time t4)

The boosting capacitor C11 starts its discharging when the two way switch S1 turns ON at a detection timing (time t3) of the zero-cross detection signal of the power voltage. The boosting capacitor C11 continues its discharging until the turning OFF (time t4) of the two way switch S1 or until the potential of the boosting capacitor C11 reaches the initial potential (in the stable condition, the time period from t0 to t1 and the time period from t3 to t4 are coincident to one another, so that the potential returns to the potential of the initial condition). The input current starts its conduction from the earlier time by the discharging current (actually, a combined current combined with the charging current of the boosting capacitor C12 in mode 1) of the boosting capacitor C11 so that the conduction angle is enlarged.

Mode 5 (from time t4 to time t5)

The two way switch S1 turns OFF after a predetermined time has passed (time t4) and the converter changes its operation to the full-wave rectification operation so that the conduction angle in the delay phase side is enlarged which operation is similar to the operation in mode 2.

Mode 6 (time t5 to time t6)

When the smoothing capacitor C2 has finished its charging (time t5), the input current assumes a non-conduction condition. And, the operation returns to mode 1 when the next zero-cross detection signal of the power voltage is detected.

The boosting capacitor C12 has a capacitance which is the same as the capacitance of the boosting capacitor C11, as is similar to the arrangement of the voltage doubler rectifier circuit. Therefore, the boosting capacitor C12 performs operations which are similar to the above operation with a delay of a half cycle.

Figure 14:
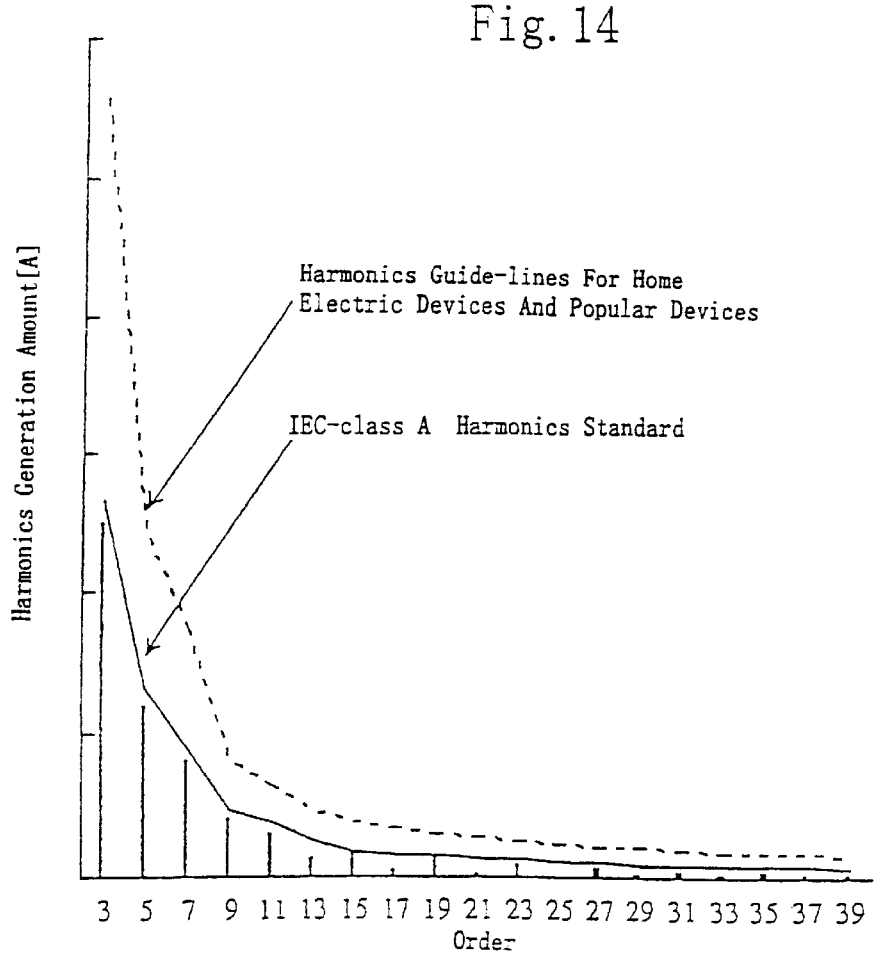
FIG. 14 is a diagram illustrating relationships between harmonics generation amounts of the converter of FIG. 12, harmonics guide-lines for home electric devices and popular devices, and IEC-class A harmonics standards.
Figure 15:
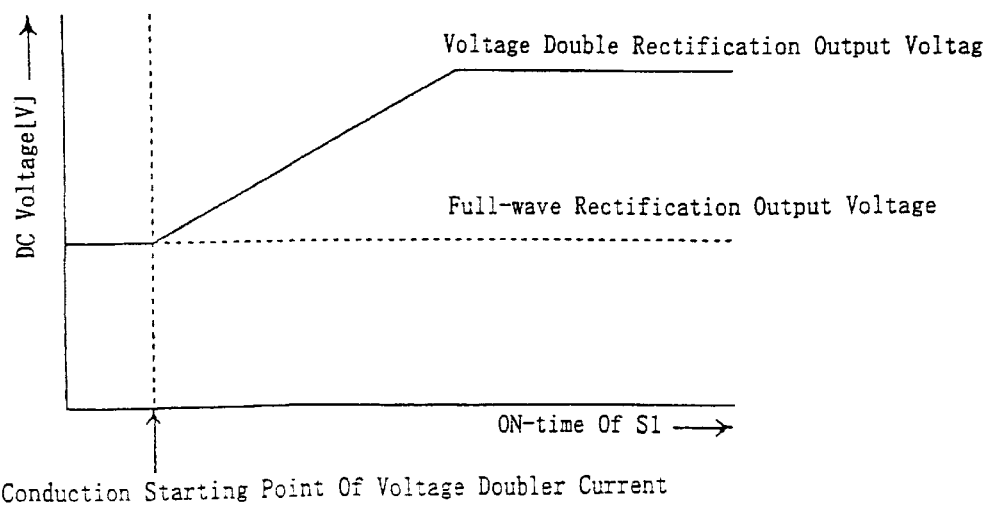
FIG. 15 is a diagram illustrating a change in an output voltage with respect to an ON-time period of a two way switch.

Summarizing the above, stepping up of the DC voltage Vdc is realized by operating the boosting capacitor C11 (the boosting capacitor C12) in voltage doubler operation so as to charge the electric charge which is greater than the electric charge charged by the full-wave rectification operation. The DC voltage Vdc can be arbitrarily controlled within the range by the ON-time period of the two way switch S1 which range is greater than the full-wave rectification output voltage and is smaller than the voltage doubler rectification output voltage. Therefore, the DC voltage Vdc is easily stepped up by lengthening the ON-time period of the two way switch S1 when the load is heavy and the DC voltage is lowered. On the contrary, the DC voltage Vdc is easily suppressed from increasing too much by shortening the ON-time period of the two way switch S1 when the load is light for increasing the DC voltage. When the converter is a measure to counter harmonics, the ON-time period of the two way switch S1 is determined to be about 2 msec to 4 msec so that the charging currents and the discharging currents of the boosting capacitors C11 and C12 have a conducting angle enlarging effect in the advance phase side and the delay phase side. Therefore, the conducting angle is greatly enlarged so that a converter with high performance is realized which converter has a high power factor and small harmonics. Further, the converter is a choke input type converter so that the generation of harmonics of medium order due to the impedance component of the power source system is not realized. FIG. 14 illustrates coordinates of the harmonics generation amount of the converter of this embodiment and the harmonics standard values of IED-class A. As is apparent from FIG. 14, the converter of this embodiment is a power source with small harmonics which is compatible to the IEC standard. Though, the Japanese harmonics guide-line (the harmonics guide-lines for home electric devices and popular devices) has values which are lightened with respect to the standard values of the IEC-class A so that the converter satisfies the Japanese harmonics guide-line with a margin. Further, the input power of the converter of this embodiment is a high power factor of 93%.

The reactor 1 employed in the input side of the full-wave rectifier circuit 2 in a conventional voltage doubler system was a large-sized reactor of about 20% (the reactor of 20% is impossible to satisfy IEC standard) because the fundamental wave phase of the voltage doubler current should be in synchronism with the power voltage. But, in this embodiment, a high efficiency converter is realized by employing the reactor of 8% through 9% which converter satisfies the IEC standard, because the converter has a conduction angle enlarging effect in delay phase side due to the full-wave rectification current.

Further, the switching is simple switching which performs switching once for every half cycle. Therefore, the control section 33 is simplified in its circuitry arrangement and is decreased in cost. And, noise generation due to carrier and the like is prevented from occurring which noise generation was the problems in the power factor improvement converter using a boosting chopper as is illustrated in FIG. 4. Further, harmonics ripple components of current due to high frequency switching do not flow through the reactor 1, so that harmonics losses of the reactor 1 are reduced and the converter efficiency is improved with respect to a power factor improvement converter using a boosting chopper illustrated in FIG. 4.

The control signal of the two way switch S1 of this embodiment is an extremely simple signal which outputs the driving signal for a predetermined time period from a trigger (zero-cross detection signal of the power voltage) so that it is easily realized by using a pulse width control section such as a multi-vibrator, as is illustrated in the embodiment of FIG. 12, for example. Further, the DC output voltage linearly changes from the full-wave rectification voltage to the voltage doubler rectification voltage depending upon the ON-time period of the two way switch S1 so that the determination of the ON-time period of the two way switch S1 can be carried out by the simple arithmetic calculation which ON-time period corresponds to a desired DC output voltage.

Figure 16:
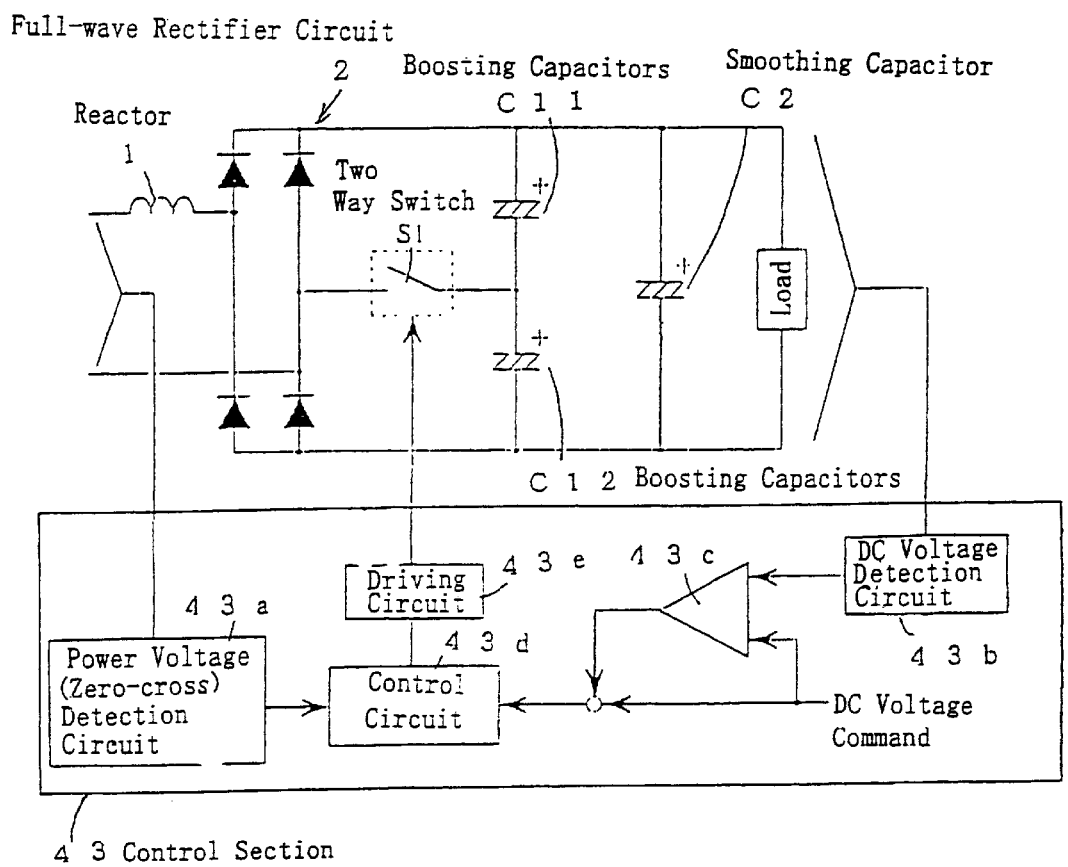
FIG. 16 is a diagram illustrating a converter of a fifth embodiment according to the present invention.

FIG. 16 is a diagram illustrating a converter of a fifth embodiment according to the present invention.

In this converter, a full-wave rectifier circuit 2 is connected between terminals of the power source (not illustrated) through a reactor 1. A smoothing capacitor C2 is connected between the output terminals of the full-wave rectifier circuit 2. Boosting capacitors (voltage doubler capacitors) C11 and C12 connected in series to one another are connected between the output terminals of the full-wave rectifier circuit 2 in parallel to the smoothing capacitor C2, the boosting capacitors C11 and C12 having the same capacitance to one another. A two way switch S1 is connected between the input terminal of the full-wave rectifier circuit 2 and the connecting point between the boosting capacitors C11 and C12. And, a control section 43 is provided which controls the two way switch S1 so as to perform switching once for every half cycle of the power voltage.

The control section 43 comprises a zero-cross detection circuit 43a for detecting a zero-cross of a power voltage, a DC voltage detection circuit 43b for detecting a DC voltage which is supplied to a load, a difference detector 43c for inputting a DC voltage command value given from the exterior and the DC voltage detected by the DC voltage detection circuit 43b and for outputting a difference between the both, a control circuit 43d for inputting the power voltage or the zero-cross detection signal of the power voltage and a DC voltage command correction value which is obtained by adding the DC voltage command value and the output from the difference detector 43c and for outputting a control signal for driving the two way switch S1, and a driving circuit 43e for inputting the output signal from the control circuit 43d and for outputting a driving signal for driving the two way switch S1.

The control circuit 43d employs one of the following control methods.

The detected power voltage and the DC voltage command value are compared in sizes and a comparison result signal is output, or a signal is output which is adjusted in phase is output for shortening the time period in the advance phase side of the comparison result signal with respect to the zero-cross point of the power voltage, or a pulse signal is output which rises by determining the zero-cross point of the power voltage to be a starting point and falls when a time period corresponding to the DC voltage command correction value has passed.

When this embodiment is employed, the ON-time period of the two way switch S1 is determined based upon the difference between the DC voltage command value and the DC voltage so that the DC voltage is controlled with accuracy. That is, when the embodiment of FIG. 12 is employed, the voltage drop due to the reactor 1 becomes greater when the input current is increased so that the DC voltage is not controlled with accuracy, but the DC voltage is controlled with accuracy by employing this embodiment.

Figure 17:
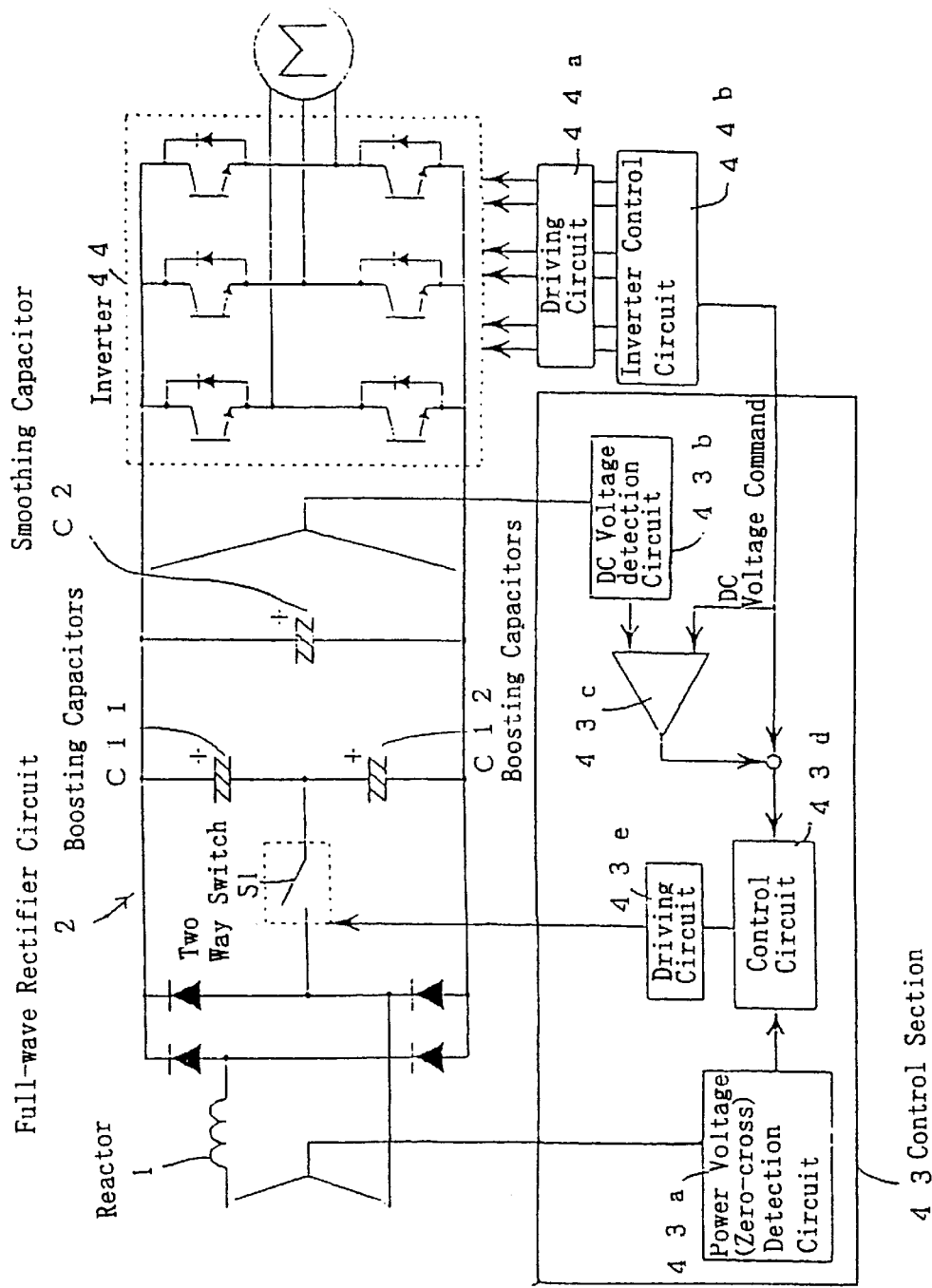
FIG. 17 is a diagram illustrating a modified example of the converter of FIG. 16.

FIG. 17 is a diagram illustrating the converter which employs an inverter for controlling a motor as a load. In FIG. 17, an inverter control circuit 44b supplies a required DC voltage value as the DC voltage command value to the control section (converter control section) 43, the inverter control circuit 44b supplying switching commands to an inverter 44 through a driving circuit 44a.

Therefore, when the V/F control of the inverter 44 is used, for example, the converter always supplies an optimum DC voltage so that the converter performs its duty for driving the inverter and motor with high efficiency by supplying the required DC voltage value as the DC voltage command value to the control section 43, the required DC voltage value being required for the inverter for performing optimum inverter driving in response to the driving condition.

Figure 18:
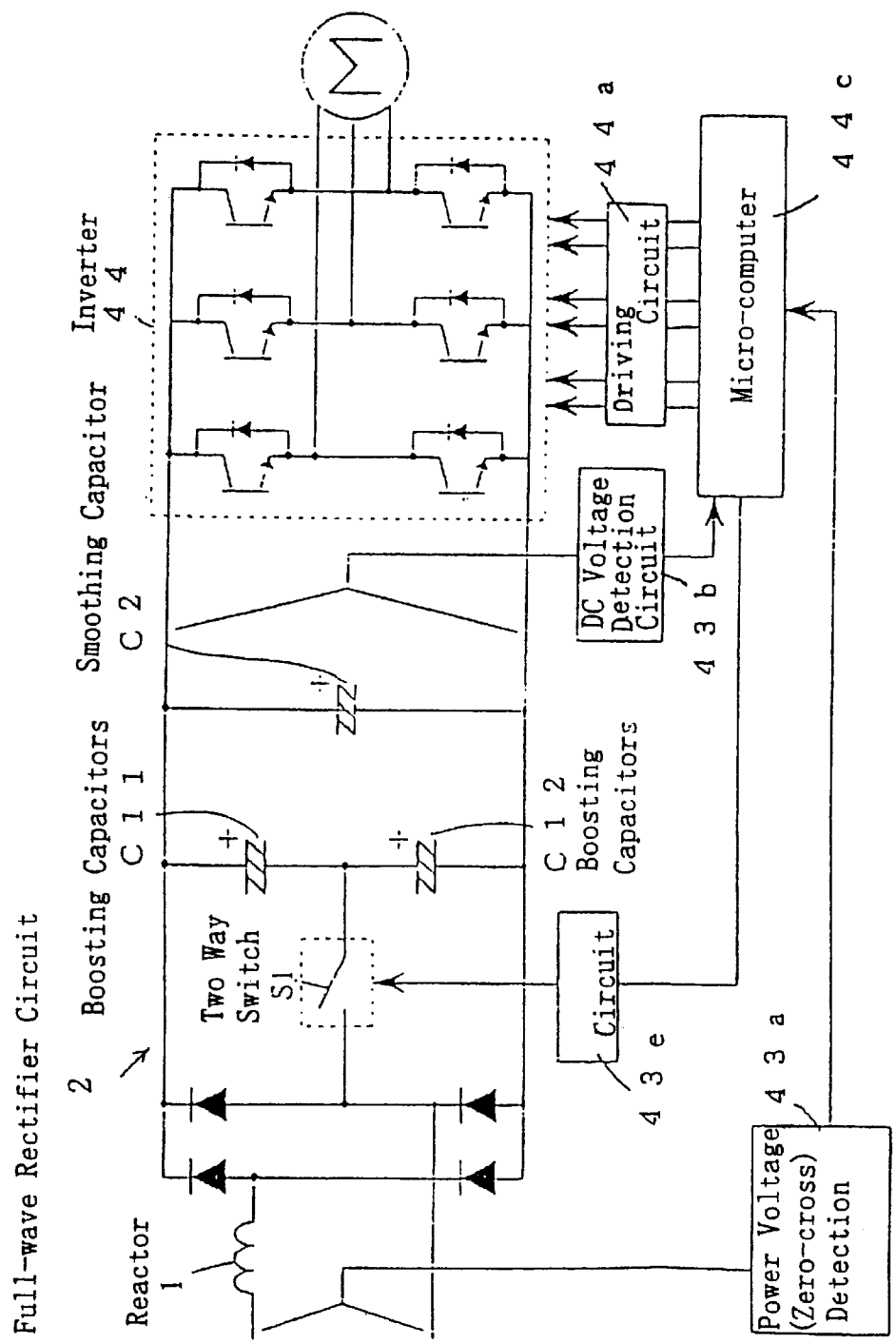
FIG. 18 is a diagram illustrating a converter of a sixth embodiment according to the present invention.

FIG. 18 is a diagram illustrating a converter of a sixth embodiment according to the present invention.

In this embodiment, an inverter for driving a motor is employed as a load. Components excepting the power voltage (zero-cross) detection circuit, the DC voltage detection circuit and the driving circuit among the components of the control section of each of the above embodiments are installed in a micro-computer 44c which drives the inverter 44.

When the micro-computer 44c should be corresponding to the embodiments of FIG. 6 and FIG. 9, it is sufficient that the comparison operation of the DC voltage command value and the power voltage and the phase adjusting operation are carried out in the micro-computer 44c. When the micro-computer 44c should be corresponding to the embodiment of FIG. 12, it is sufficient that starting of an inner timer by the zero-cross detection signal of the power voltage and the outputting of the driving signal for driving the two way switch S1 are carried out simultaneously to one another in the micro-computer 44c, and that the turning OFF of the driving signal after the counting of a predetermined count has finished by the inner timer is carried out in the micro-computer 44c. And, the DC voltage, improvement in harmonics and improvement in power factor are controlled by only the count number of the inner timer. Further, when the micro-computer 44c should be corresponding to any one of the embodiments, it is sufficient that the control program of the micro-computer 44c is a simple control program.

Furthermore, in a control circuit usually used in an air conditioner, a zero-cross detection circuit for detecting a zero-cross of the power voltage is mounted, and a DC voltage command value from the inverter should not be received from the other section, especially. Therefore, addition parts for adding to the voltage doubler rectification system are scarcely required excepting the two way switch S1 and the driving circuit thereof when the control of the two way switch S1 is installed in the micro-computer for the inverter. Consequently, a motor driving system with low cost, space saving and high performance is constituted. In the system, one or two output ports and one inner timer are required for the micro-computer as hardware.

Further, when the DC voltage becomes the α-times voltage, the current capacity of the inverter for driving the load becomes $1/\alpha$ times capacitance which load has the same capacitor as the previous capacitor. And, the heat generation of the inverter is decreased in proportion to the decrease in the current capacity. Therefore, the inverter is decreased in size and is decreased in cost. Furthermore, as is described in the above, the DC voltage is arbitrarily changed by the command of the inverter, so that the V/F control is performed effectively and that increasing in efficiency of the inverter and the motor is realized.

As is described in the above, the upper limit of the frequency of the motor is determined based upon the driving voltage. That is, the upper limit frequency increases nearly proportional to the driving voltage so that the increase in the driving voltage gives the effect in that the driving range of the motor is enlarged. An air conditioner performs driving with maximum ability for rapid cooling (rapid warming) when driving is started, and the enlargement in the driving range greatly improves the rapid cooling (rapid warming) ability. Further, this embodiment is a useful technique for realizing the unification of compressor motors of air conditioners each having ability different from one another so that this embodiment greatly contributes to decreasing in cost.

On the other hand, high efficiency and suppression in harmonics are realized in the individual converter. Also, the IEC harmonics standard (class A) corresponding to several kW is satisfied by a circuitry arrangement which has low cost and small space, the IEC harmonics standard being satisfied by a PWM converter or a passive type converter having high cost and large size in the past. Further, a high power factor is realized which exceeds 90% with a margin. Furthermore, the switching is a simple switching for performing switching once for every half cycle, problems are not generated which are exemplified by noises, harmonics losses and the like and are raised in the PWM system.

Further, the ON-time period of the two way switch is arbitrarily changed so that optimum converter driving corresponding to the situation is easily performed, the converter driving being exemplified in that the DC voltage is suppressed when the load is light, the DC voltage is increased when the load is heavy, the harmonics and power factor are controlled having priority when the load is a rated load.

In the above control, an estimate of load condition is needed. But, the load condition can be estimated using an input current of a device, an output current from the converter, an inverter frequency or the like. Therefore, the load estimation is easily realized by using information such as an input current of a device, an inverter frequency or the like which are conventionally held in an inverter control circuitry (micro-computer) of an air conditioner or the like.

Further, a load capacity calculation is not required by holding the optimum ON-time period of the two way switch S1 corresponding to an input current of a device or an inverter frequency in a memory of the micro-computer previously. Therefore, the control is more simplified.

Figure 23:
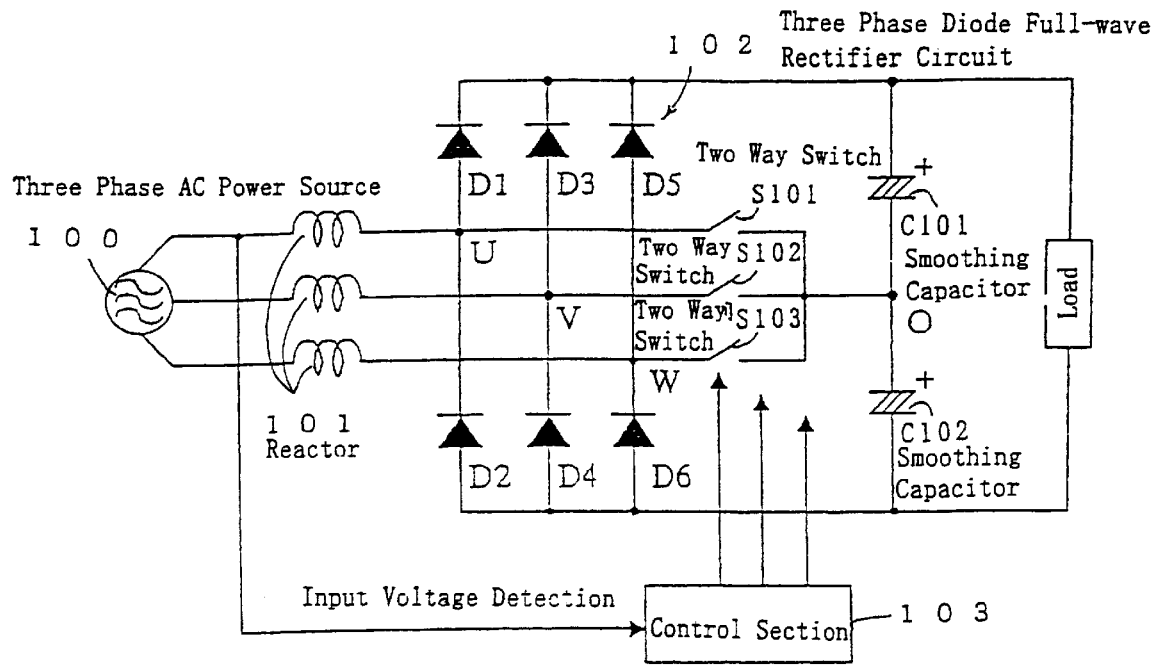
FIG. 23 is an electric circuit diagram illustrating a converter of a seventh embodiment according to the present invention.

FIG. 23 is an electric circuit diagram illustrating a converter of a seventh embodiment according to the present invention.

In this converter, an output terminal of each phase of a three phase AC power source 100 is connected to each input terminal of a three phase diode full-wave rectifier circuit 102 through a reactor 101, respectively. Smoothing capacitors C101 and C102, each smoothing capacitor having the same capacitance to one another, are connected in series between the output terminals of the three phase diode full-wave rectifier circuit 102. Two way switches S101, S102 and S103 are connected between each input terminal of the three phase diode full-wave rectifier circuit 102 and the connecting point between the smoothing capacitors C101 and C102, respectively. A control section 103 is provided which controls the two way switches S101, S102 and S103 so that the two way switches S101, S102 and S103 are switched once for every half cycle of the power voltage.

The control section 103 detects the phase voltages of the three phase AC power source 100 and outputs control signals for turning the two way switches S101, S102 and S103 ON at predetermined timings based upon the phase voltages.

Then, the operation of the converter having the above arrangement is described by referring to waveforms of each section illustrated in FIGS. 26(a) through 26(f).

Figure 24:
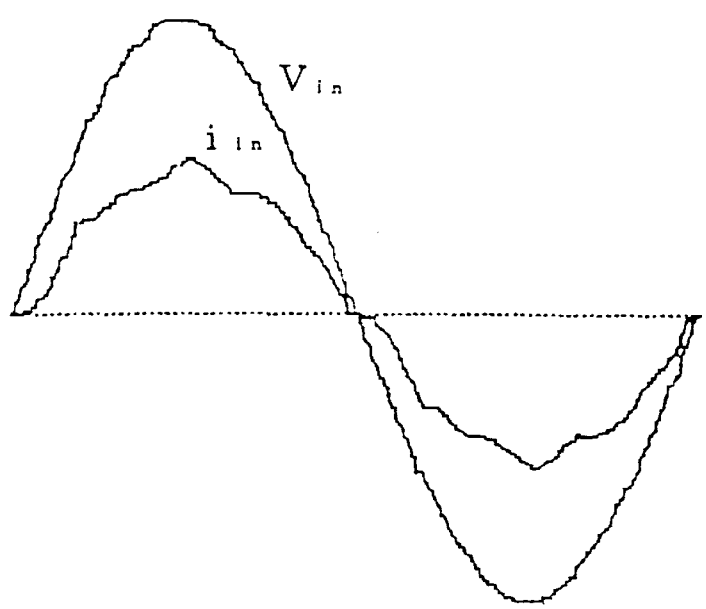
FIG. 24 is a diagram illustrating an input voltage waveform and an input current waveform of the inverter of FIG. 23.
Figure 26:
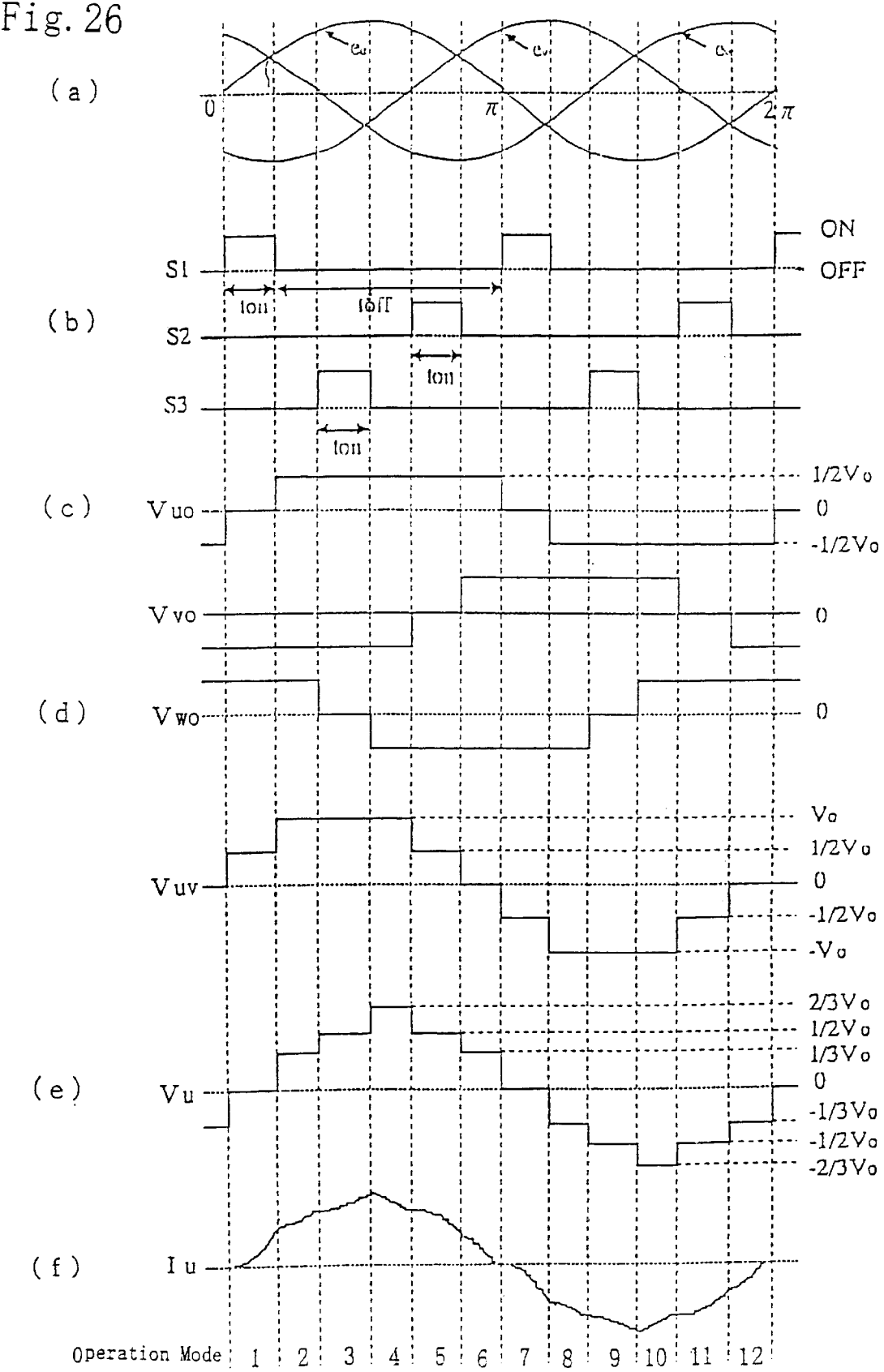
FIGS. 26(a) through 26(f) are diagrams illustrating waveforms of each section of the converter of FIG. 23.

The power voltages of the three phase AC power source 100 change, as are illustrated in FIG. 26(a). And, the control section 103 detects a zero-cross of a power voltage of each phase and outputs the control signals for turning the two way switch of the corresponding phase ON, as are illustrated in FIG. 26(b). The phase voltage at each input terminal of the three phase diode full-wave rectifier circuit 102 becomes zero in correspondence to the ON-time period of corresponding two way switch, as is illustrated in FIG. 26(c). And, the phase voltage changes to repeat the value of VO/2 and −VO/2 through the time period of value zero. Wherein, VO represents the DC voltage. Therefore, the line voltage at each input terminal of the three phase diode full-wave rectifier circuit 102 has a waveform having 8 steps for one cycle, the waveform having 5-level amplitudes of VO, VO/2, 0, −VO/2 and −VO, as is illustrated in FIG. 26(d). The converter input voltage with respect to the center point of the power voltage (the voltage at each input terminal of the three phase diode full-wave rectifier circuit 102) has a waveform having 12 steps for one cycle, the waveform having 7-level amplitudes of 2VO/3, VO/2, VO/3, 0, −VO/3, −VO/2 and 2VO/3, as is illustrated in FIG. 26(e). Further, the input voltage and the input current have waveforms which are illustrated in FIG. 24.

Figure 25:
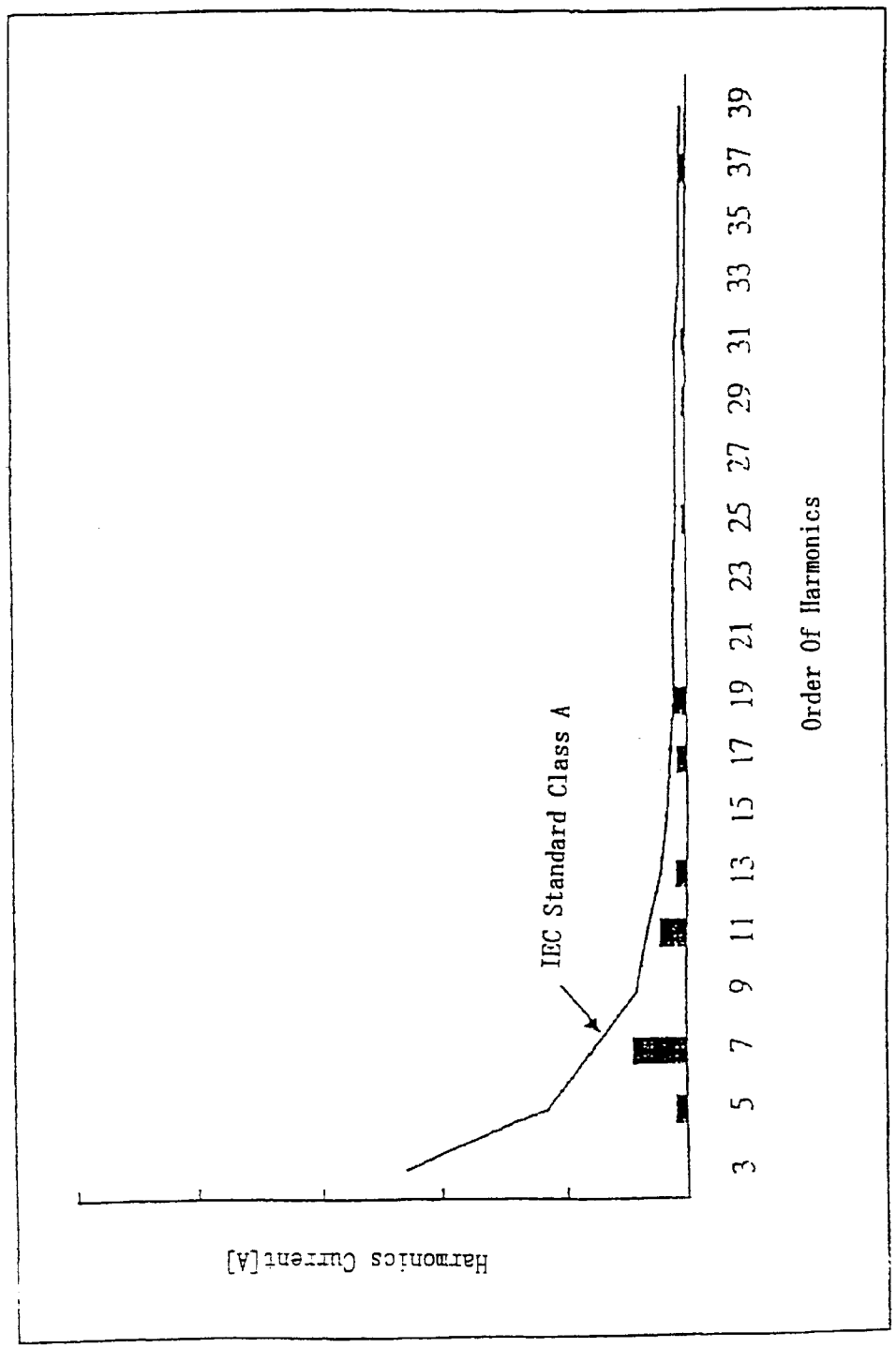
FIG. 25 is a diagram illustrating relationships between harmonics generation amounts of the converter of FIG. 23, and IEC-class A harmonics standards.

In such a manner, the converter input voltage is determined to have the waveform having 12 steps so that the input current has a waveform which is similar to a sine shape, as is illustrated in FIG. 26(f) and that harmonics reducing effect more than the conventional three phase 12 pulses rectifier circuit system is realized (refer to FIG. 25).

In the embodiment of FIG. 23, the ON-time period of each alternate switch (two way switch) can be changed.

Figure 27:
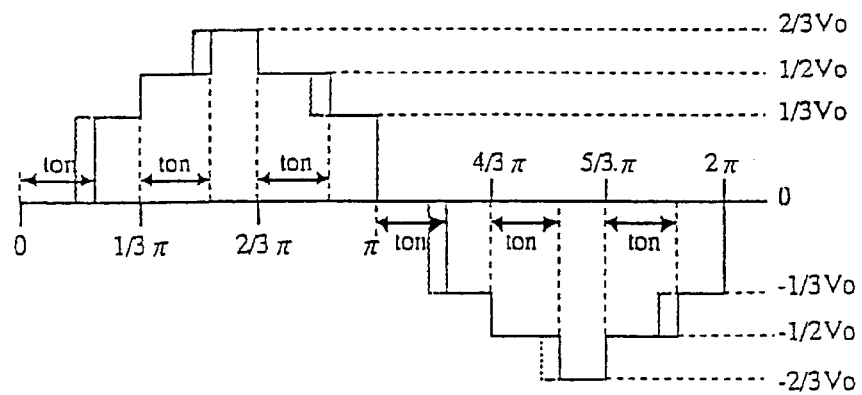
FIG. 27 is a diagram illustrating a converter input voltage waveform depending upon the change of the ON-time period of the two way switch.

FIG. 27 is a diagram explaining the change in the converter input voltage waveform when the ON-time period is changed.

When the converter input voltage waveform is changed, each harmonics content is changed so that a specific harmonics component is removed or is reduced.

Figure 28:
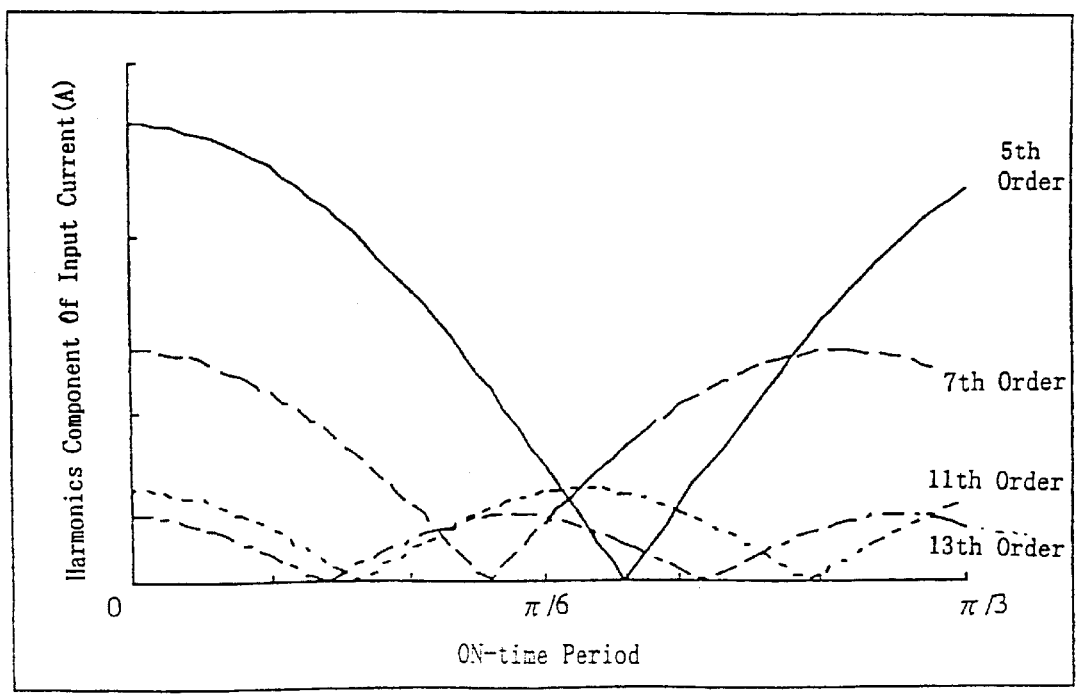
FIG. 28 is a diagram illustrating changing characteristics of the input current harmonics components with respect to the ON-time period.

FIG. 28 is a diagram illustrating harmonics current characteristics with respect to the ON-time period of the alternate switch.

Referring to this Figure, it is understood that the fifth order harmonics component and this seventh order harmonics component are reduced by determining the ON-time period to be $\pi/6$. Further, the fifth order harmonics component is removed by determining the ON-time period to be $\pi/5$, while the seventh order harmonics component is removed by determining the ON-time period to be $\pi/7$.

Further, the turning ON timing of each alternate switch can be changed in the embodiment of FIG. 23.

Figure 29:
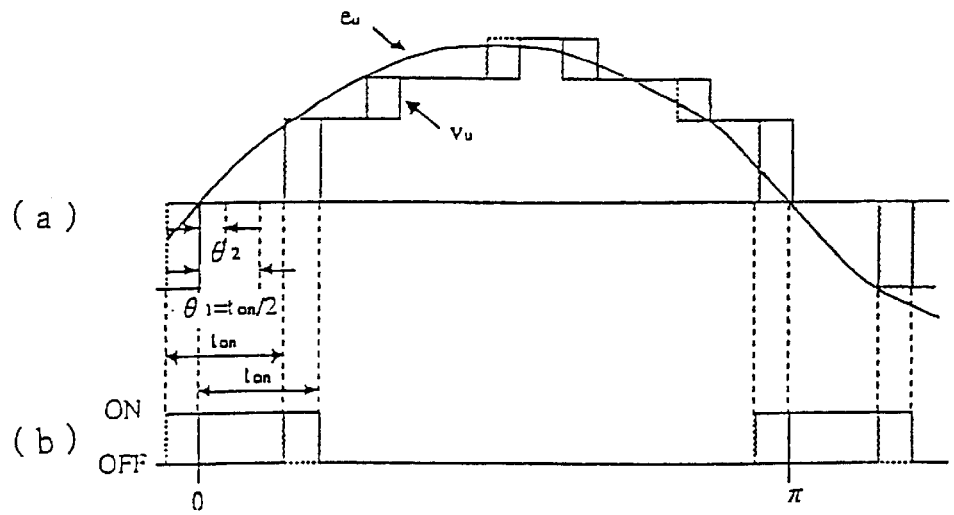
FIGS. 29(a) and 29(b) are diagrams illustrating the power voltage and the change in the converter input voltage depending upon the change in the ON-timing of the two way switch.

FIGS. 29(a) and 29(b) are diagrams for explaining the converter input voltage waveform when the ON-time period is changed. Further, the power voltage is illustrated together. In FIG. 29(a), the power voltage waveform and the converter input voltage waveform are illustrated, while in FIG. 29(b), the ON condition of the alternate switch corresponding to the timing change.

When the converter input voltage waveform is changed in such manner, it is sufficient that the input current is detected as load information, and that the timing for turning the two way switch ON is changed corresponding to the detection value, and that the difference θ in phase of the converter input voltage with respect to the power voltage. Therefore, a condition is maintained in which specific harmonics components are removed or reduced within an entire load changing extent.

Figure 30:
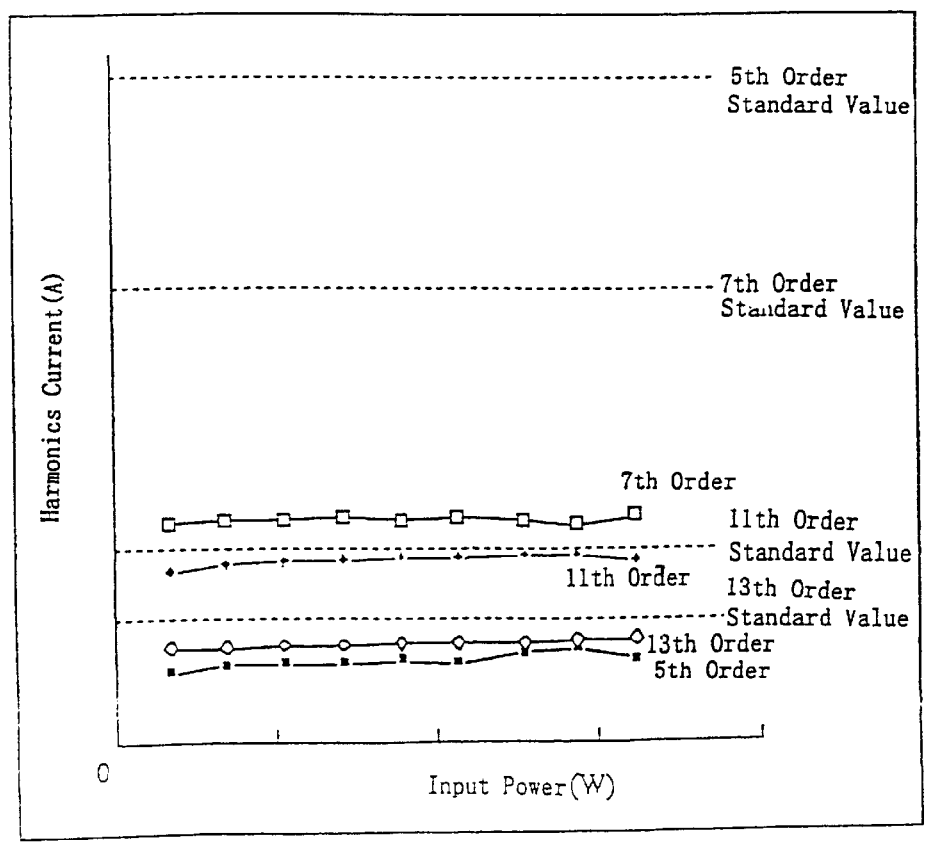
FIG. 30 is a diagram illustrating the changing characteristics in the harmonics current of each order with respect to the input power.

When the ON-time period of the two way switch is determined so that each harmonics component satisfies IEC standard class A and when the phase control of the converter input voltage is performed corresponding to the load, the harmonics standard is satisfied within an entire load changing extent, as is illustrated in FIG. 30.

Figure 31:
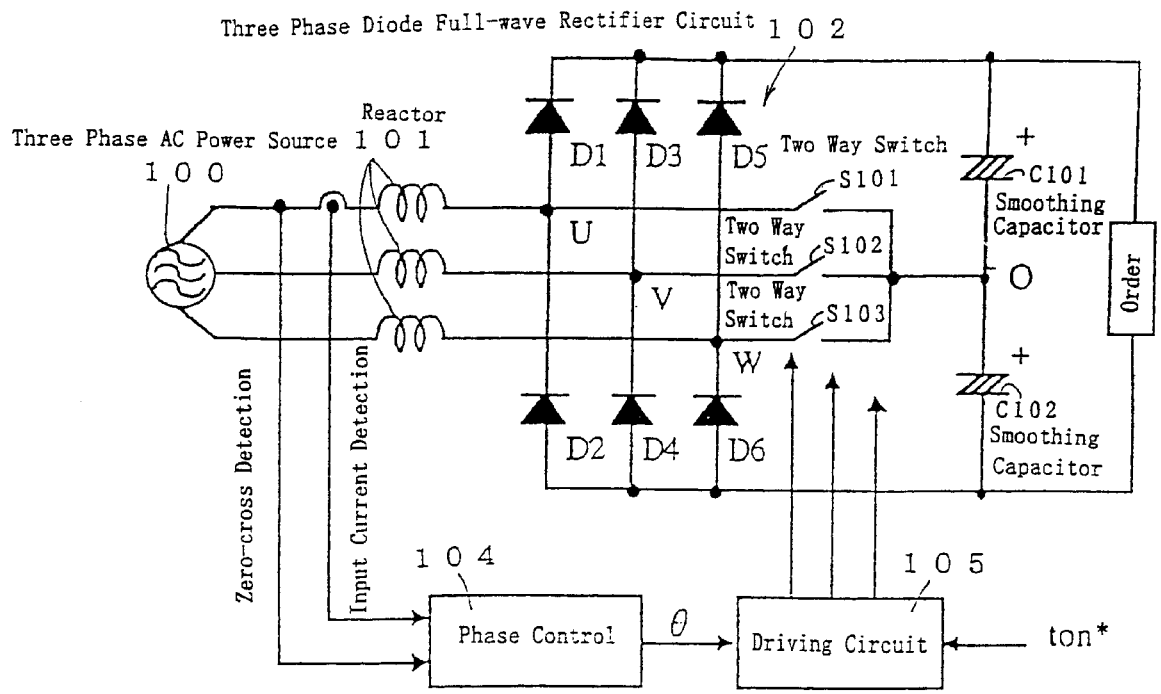
FIG. 31 is an electric circuit diagram illustrating a converter of an eighth embodiment according to the present invention.

FIG. 31 is an electric circuit diagram illustrating a converter of an eighth embodiment according to the present invention.

The converter of FIG. 31 is different from the converter of FIG. 23 only in that a phase control section 104 for detecting the input current and for detecting the zero-crosses of the three phase AC voltage and for outputting a phase difference command (ON timing command) θ for performing phase control, and a driving circuit 105 for inputting this phase difference command θ and the ON-time period command and for outputting two way switch driving signals for turning each two way switch ON for the ON-time period which has started from the ON timing are provided instead of the control section 103.

Figure 32A:
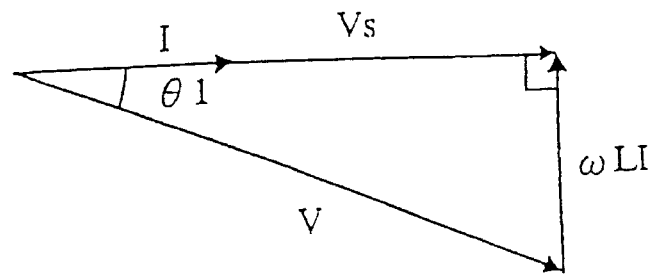
FIGS. 32(a) and 32(b) are diagrams illustrating voltage vector diagrams corresponding to heavy load and light load.
Figure 32B:
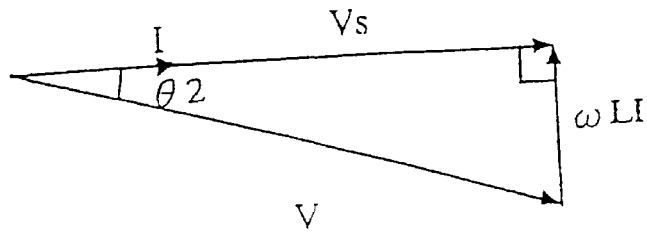

FIGS. 32(a) and 32(b) illustrate voltage vector diagrams corresponding to heavy load and light load, respectively.

The fundamental wave I of the input current and the power voltage Vs have the same phase to one another in any one of the voltage vector diagrams. In other words, the phase of the fundamental wave I of the input current and the phase of the power voltage Vs are determined to be the same by changing the ON timing of the two way switch corresponding to the input current and by controlling the phase difference θ with respect to the power voltage Vs. Further, the size of the fundamental wave V of the converter input voltage is controlled by changing the ON-time period of the two way switch.

By performing the control in such a manner, the fundamental wave power factor of the input current is always maintained to be 1. Further, in the phase control section 104, the phase difference command θ is calculated by performing the operation of $\theta=\tan^{-1}(\omega L \cdot I/Vs)$.

Figure 33:
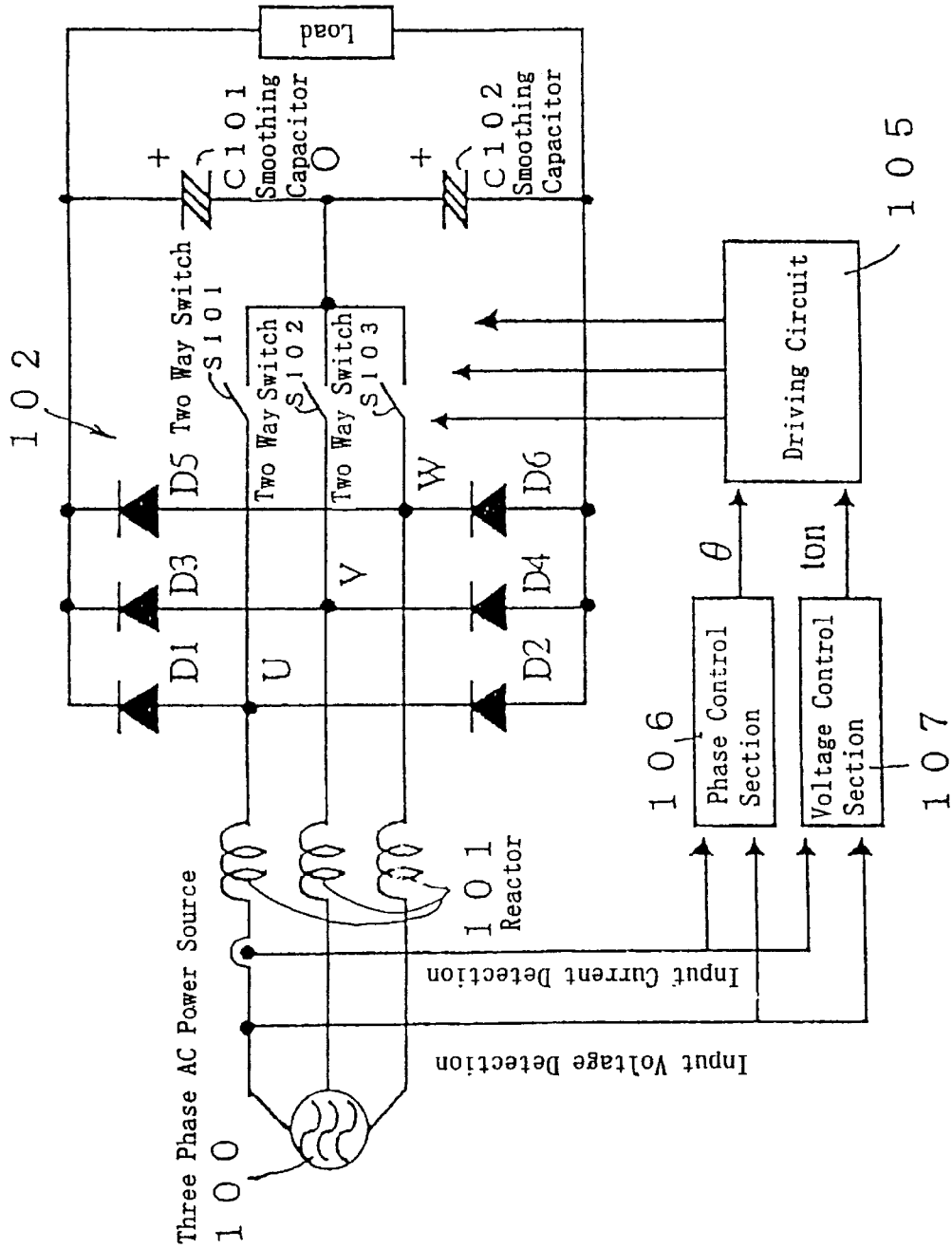
FIG. 33 is an electric circuit diagram illustrating a converter of a ninth embodiment according to the present invention.

FIG. 33 is an electric circuit diagram illustrating a converter of a ninth embodiment according to the present invention.

The converter of FIG. 33 is different from the converter of FIG. 31 only in that a phase control section 106 for detecting the input current and for detecting the input voltage and for outputting a phase difference command (ON timing command) θ for performing the phase control, and a voltage control section 107 for detecting the input current and for detecting the input voltage and for outputting an ON-time period command ton are provided instead of the phase control section 104.

Figure 34A:
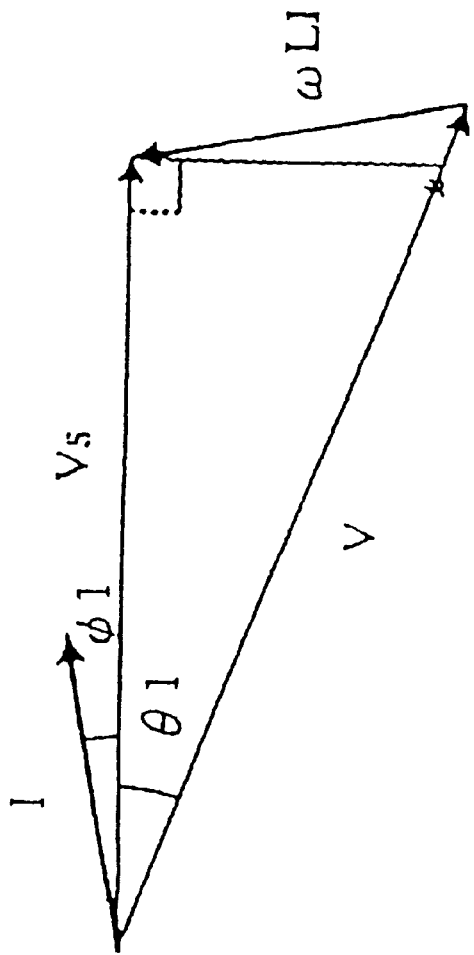
FIG. 34(a) and 34(b) are diagrams illustrating voltage vector diagrams corresponding to advance phase and delay phase.
Figure 34B:
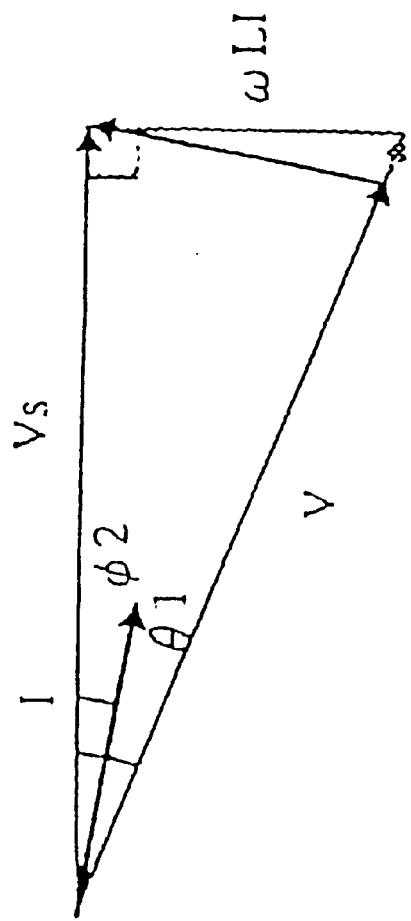

When the converter having this arrangement is employed, the phase difference command θ is output similarly to the converter of FIG. 31 and the ON-time period command ton is output by the voltage control section 107. Wherein, the voltage control section 107 detects the phase difference between the power voltage and the fundamental wave of the input current and determines and outputs the ON-time period command ton of the two way switch so that the phase of the power voltage and the phase of the fundamental wave of the input current are the same to one another. Specifically, when the input current has an advance phase as is illustrated in FIG. 34(a), the ON-time period command ton is shortened so as to decrease the converter input voltage. When the input current has a delay phase as is illustrated in FIG. 34(b), the ON-time period command ton of the two way switch is lengthened so as to increase the converter input voltage.

Therefore, when only the phase of the converter input voltage is controlled using the converter of FIG. 31, slight phase difference is generated between the fundamental wave of the input current and the power voltage so that the input power factor is lowered to some degree. But, when the converter having the arrangement of FIG. 33 is employed, the size of the converter input voltage is also controlled so that the phase of the power voltage and the phase of the fundamental wave of the input current are determined to be the same to one another and that the input power factor is maintained to be a high factor.

Figure 35:
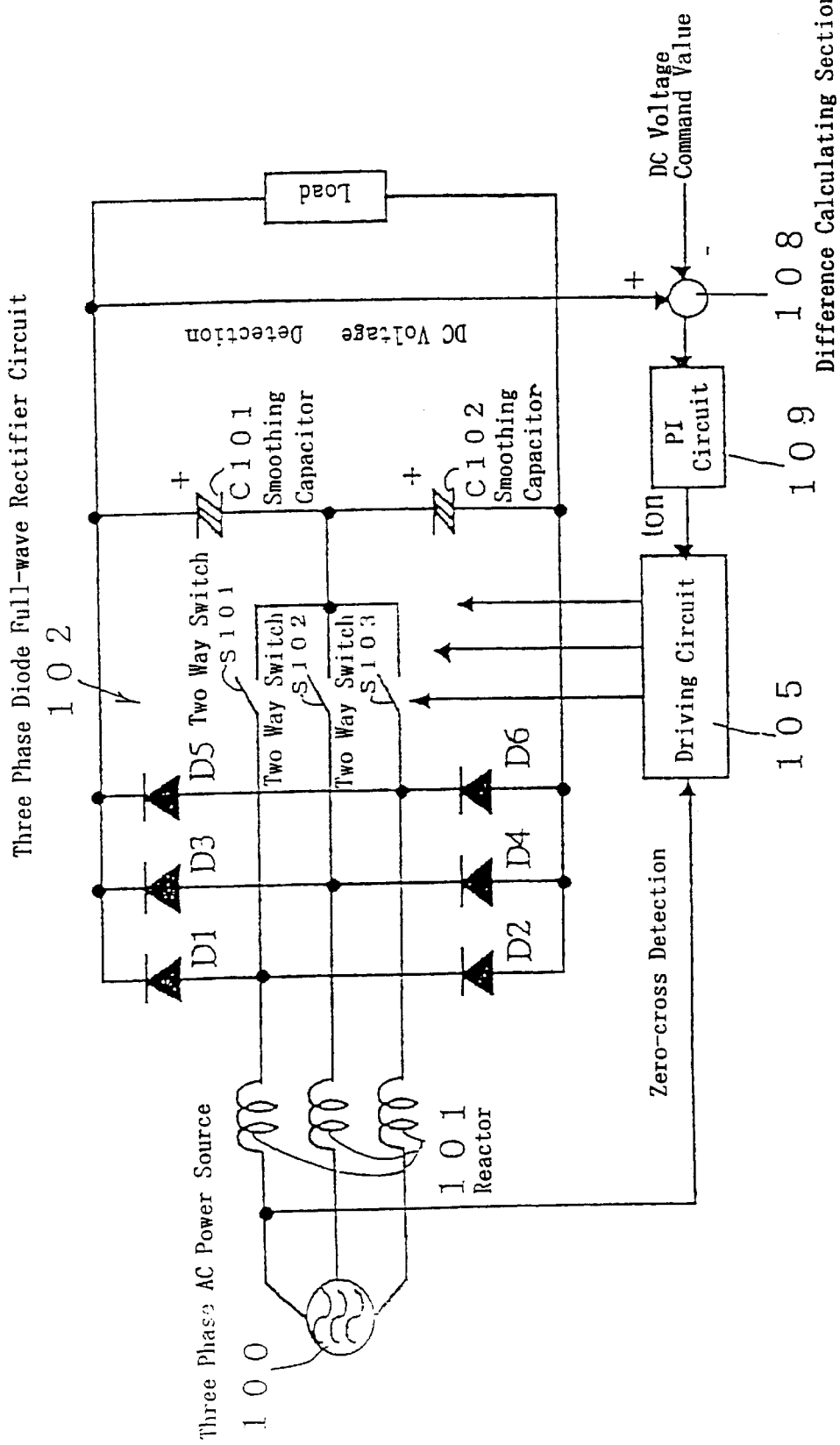
FIG. 35 is an electric circuit diagram illustrating a converter of a tenth embodiment according to the present invention.

FIG. 35 is an electric circuit diagram illustrating a converter of a tenth embodiment according to the present invention.

The converter of FIG. 35 is different from the converter of FIG. 31 only in that a difference calculation section 108 for detecting a DC voltage and for calculating a difference between the DC voltage and the DC voltage command value, and a PI circuit 109 for inputting the calculated difference and for carrying out the PI(proportional. integral) control and for outputting an ON-time period command ton of the two way switch are employed instead of the phase control section 104, and that, in the driving circuit 105, the zero-cross of the power voltage is detected, the ON-time period ton of the two way switch is input, and the two way switch driving signal is output for turning the two way switch ON for the time period ton which starts from the zero-cross.

When the converter of this embodiment is employed, the DC voltage is detected, the difference between the detected DC voltage and the DC voltage command value is calculated, and the ON-time period of the two way switch is changed corresponding to the calculated difference, so that the stable DC voltage is supplied despite the change in the power voltage and the change in the load.

Figure 36:
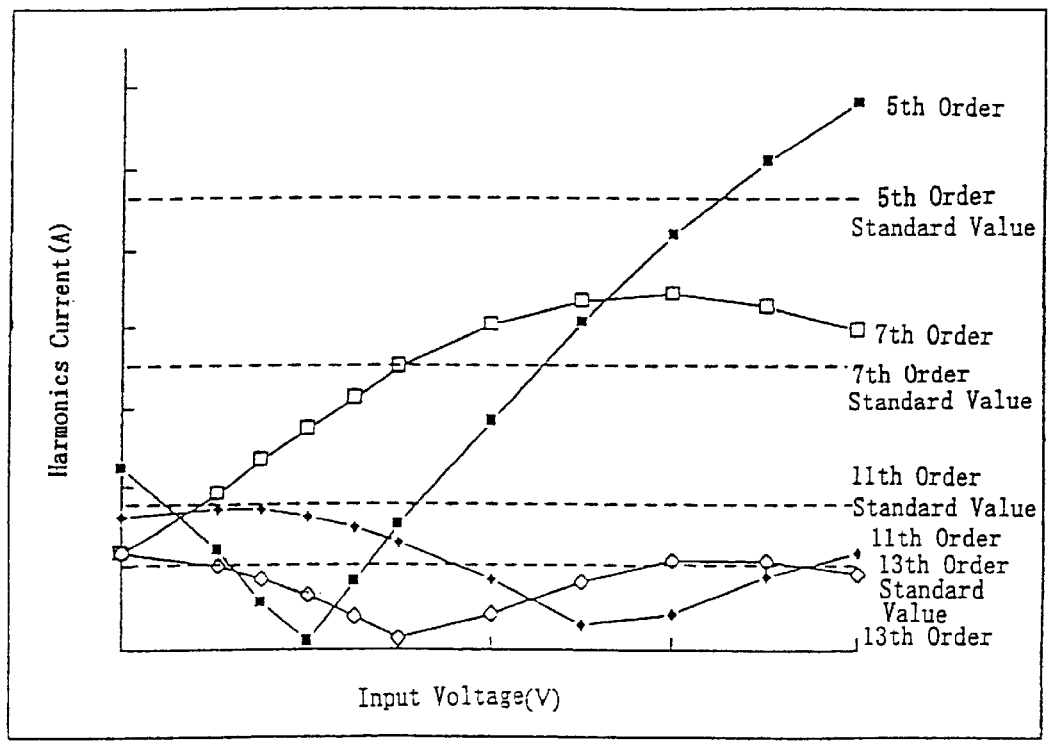
FIG. 36 is a diagram illustrating the changing characteristics in the harmonics current of each order with respect to the input power at the maximum load.
Figure 37:
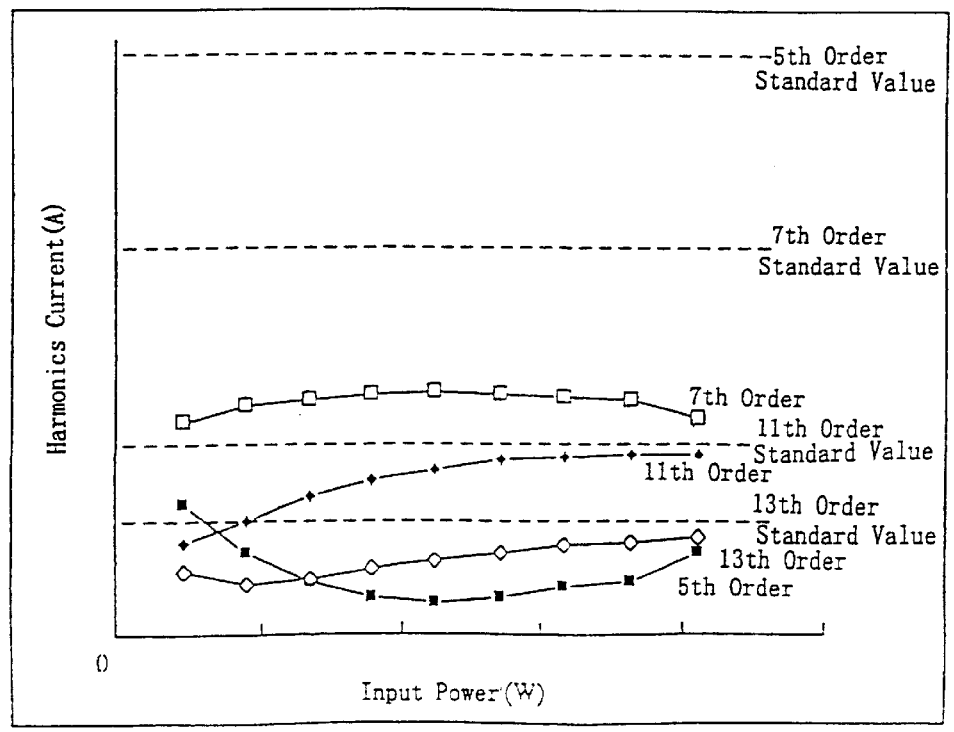
FIG. 37 is a diagram illustrating the changing characteristics in the harmonics current of each order with respect to the input power under the control of the DC voltage.

Further, the harmonics currents change in correspondence to the DC voltage determination value (which is similar to the characteristics in correspondence to the ON-time period of the two way switch), as is illustrated in FIG. 36, so that the harmonics standard is satisfied with an entire load change extent by performing the control for maintaining the DC voltage to be a constant value with the DC voltage which determines each harmonics current to satisfy IEC standard class A when the load is the maximum load (refer to FIG. 37).

Figure 38:
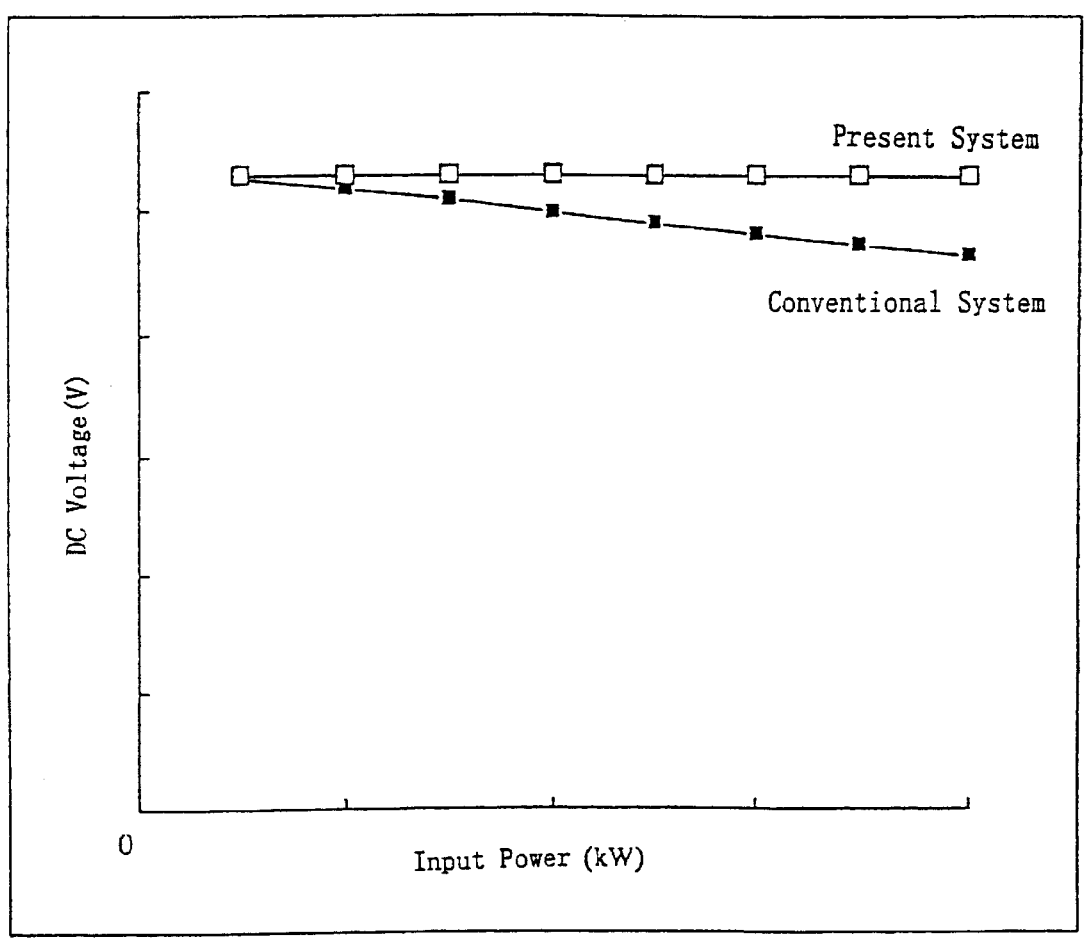
FIG. 38 is a diagram illustrating the changing characteristics in the DC voltage with respect to the input power.

Furthermore, when this embodiment is employed, it is understood that the DC voltage is not lowered even when the load is increased (refer to a white rectangle in FIG. 38), as is illustrated in the DC voltage-input power characteristics diagram in FIG. 38. While, a black rectangle represents a characteristics diagram of a conventional converter, and the DC voltage is lowered following the increase in load.

Figure 39:
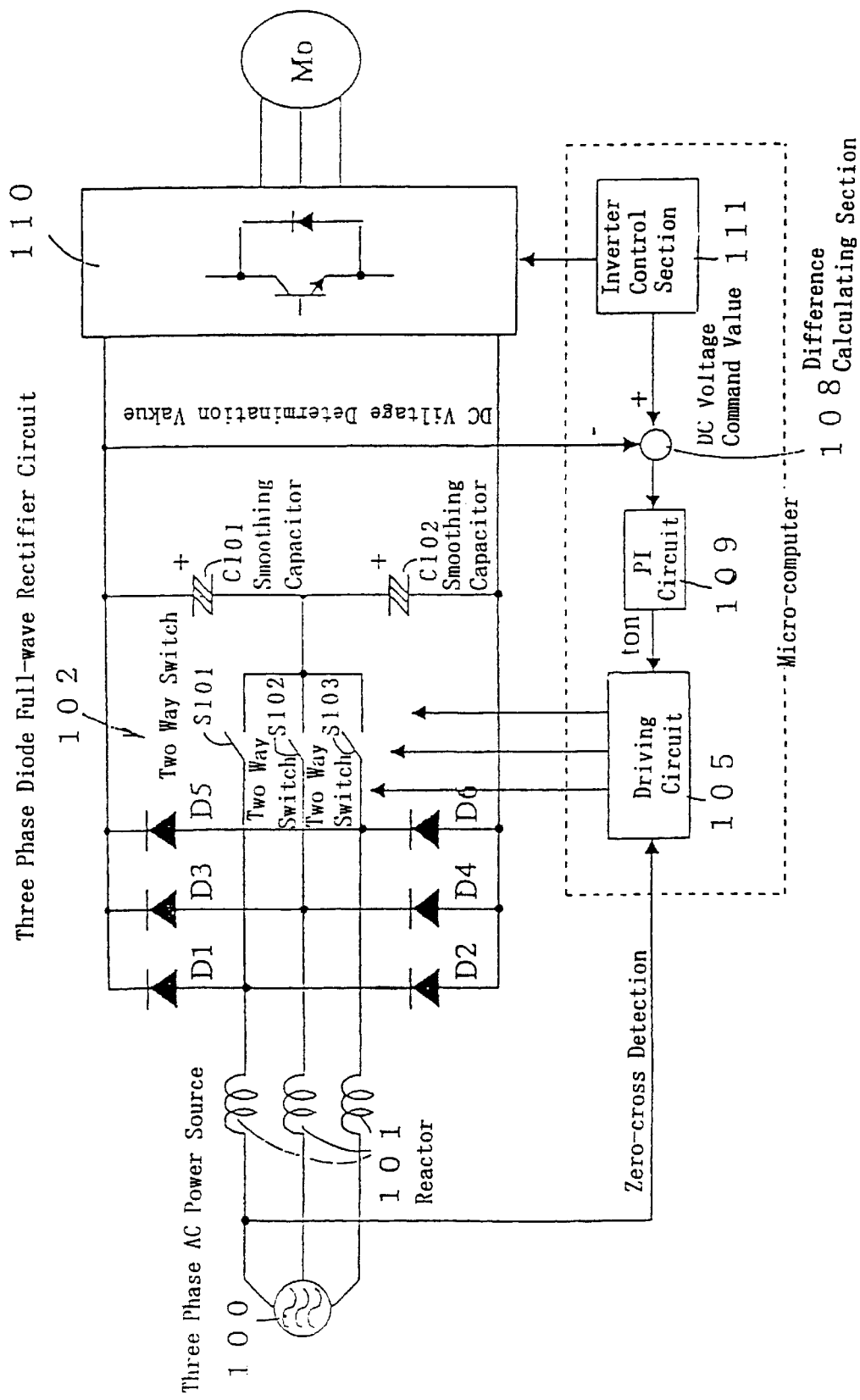
FIG. 39 is an electric circuit diagram illustrating a converter of an eleventh embodiment according to the present invention.

FIG. 39 is an electric circuit diagram illustrating a converter of an eleventh embodiment according to the present invention.

The converter of FIG. 39 is different from the converter of FIG. 35 only in that the DC voltage is supplied to an inverter circuit 110 which is a load and the inverter circuit 110 drives the motor Mo, and that the DC voltage command value is output from an inverter control section 111 to the difference calculation section 108 which inverter control section 111 controls the inverter circuit 110.

When the converter having this arrangement is employed, the DC voltage required by the inverter circuit 110, for example, the DC voltage required for realizing the optimum V/F pattern of the V/F control, is supplied.

Figure 19A:
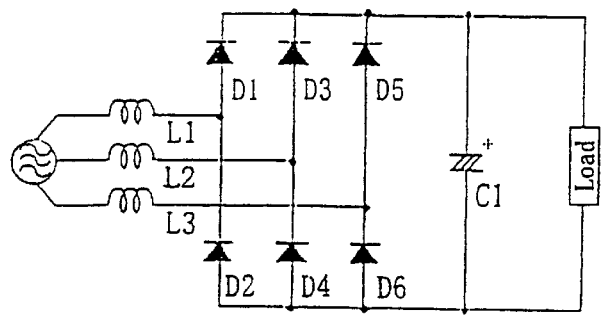
FIG. 19(a) is a diagram illustrating a conventional choke input type rectification circuit.
Figure 19B:
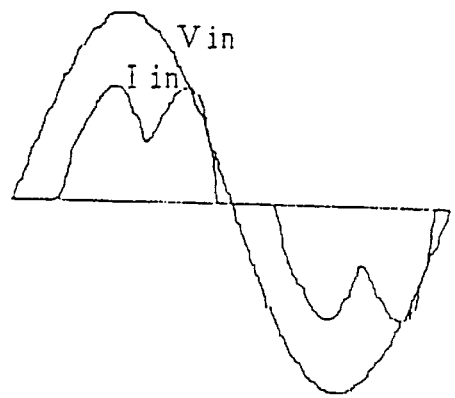
FIG. 19(b) is a diagram illustrating an input voltage waveform and an input current waveform.
Figure 19C:
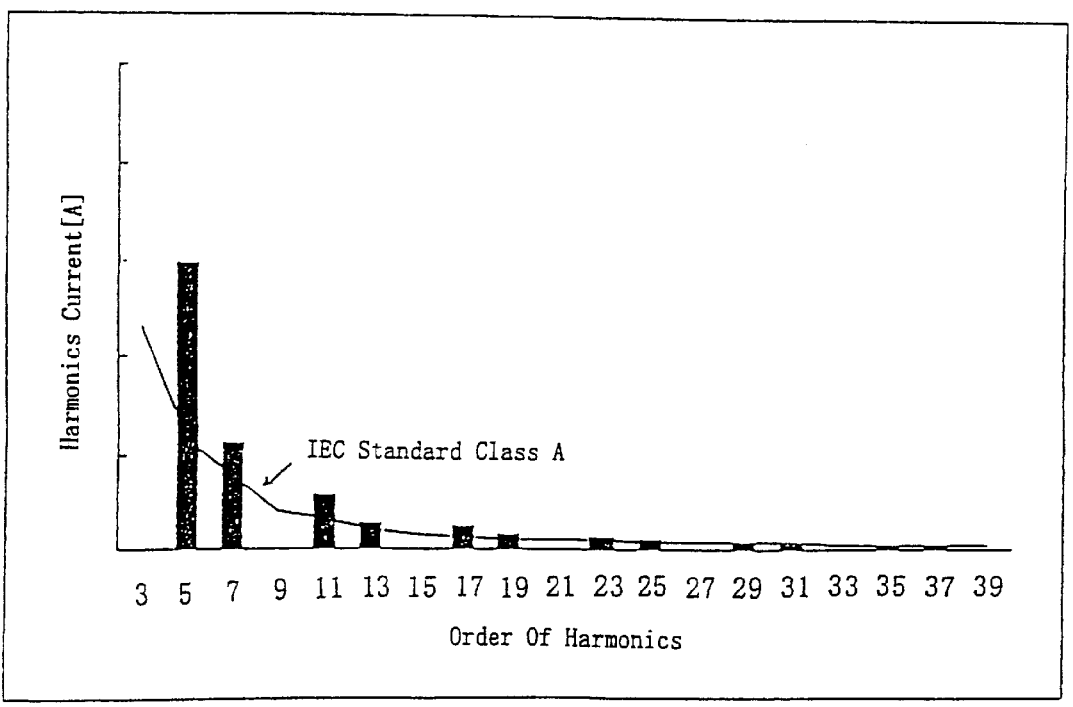
FIG. 19(c) is a diagram illustrating relationships between harmonics generation amounts, and IEC-class A harmonics standards.
Figure 20A:
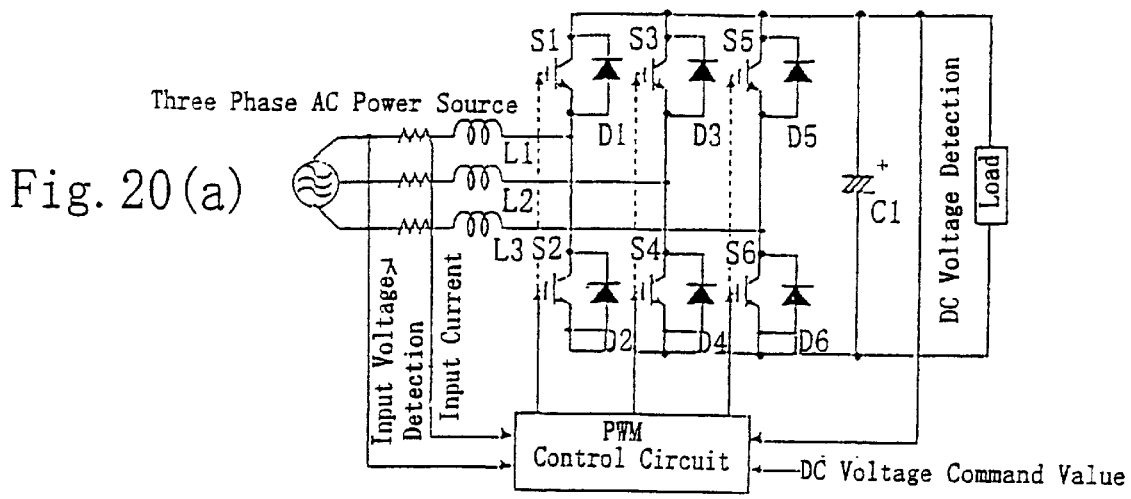
FIG. 20(a) is a diagram illustrating a conventional PWM converter.
Figure 20B:
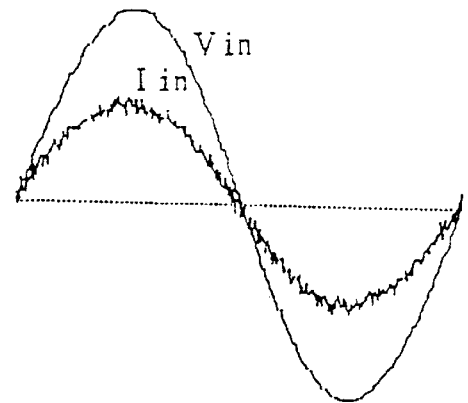
FIG. 20(b) is a diagram illustrating an input voltage waveform and an input current waveform.
Figure 20C:
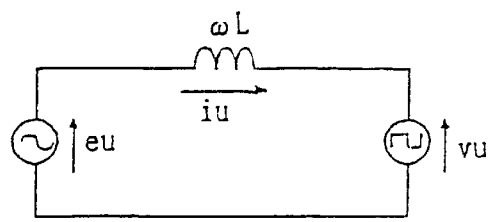
FIG. 20(c) is a diagram illustrating an equivalent circuit of each phase of the conventional PWM converter.
Figure 20D:
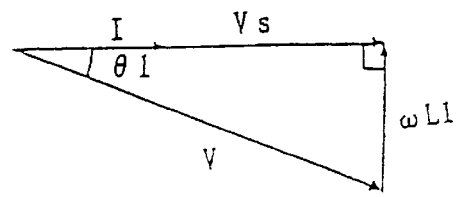
FIG. 20(d) is a diagram illustrating a voltage vector diagram.
Figure 21:
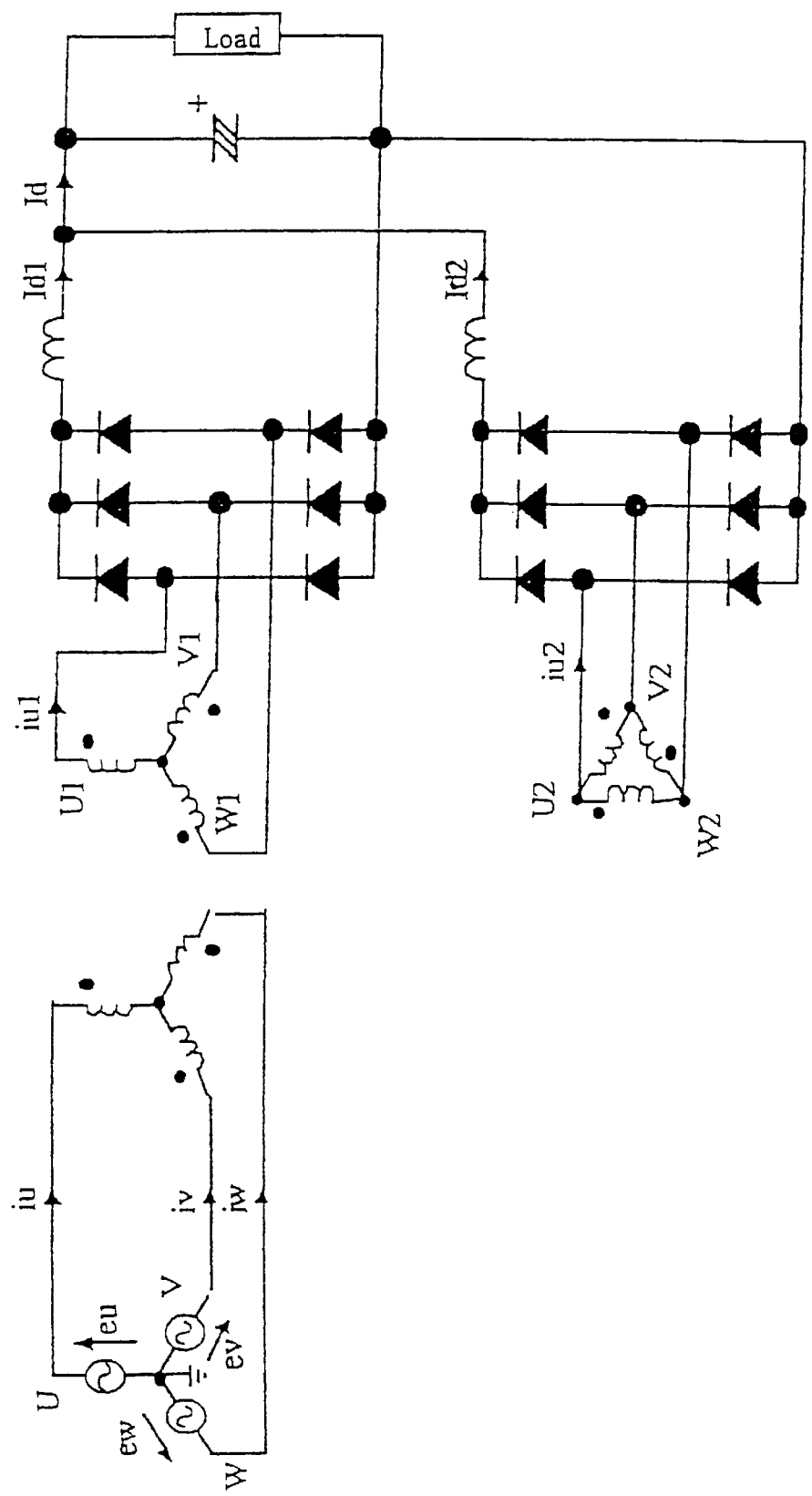
FIG. 21 is a diagram illustrating a conventional three phase 12-pulses rectifier circuit system.
Figure 22:
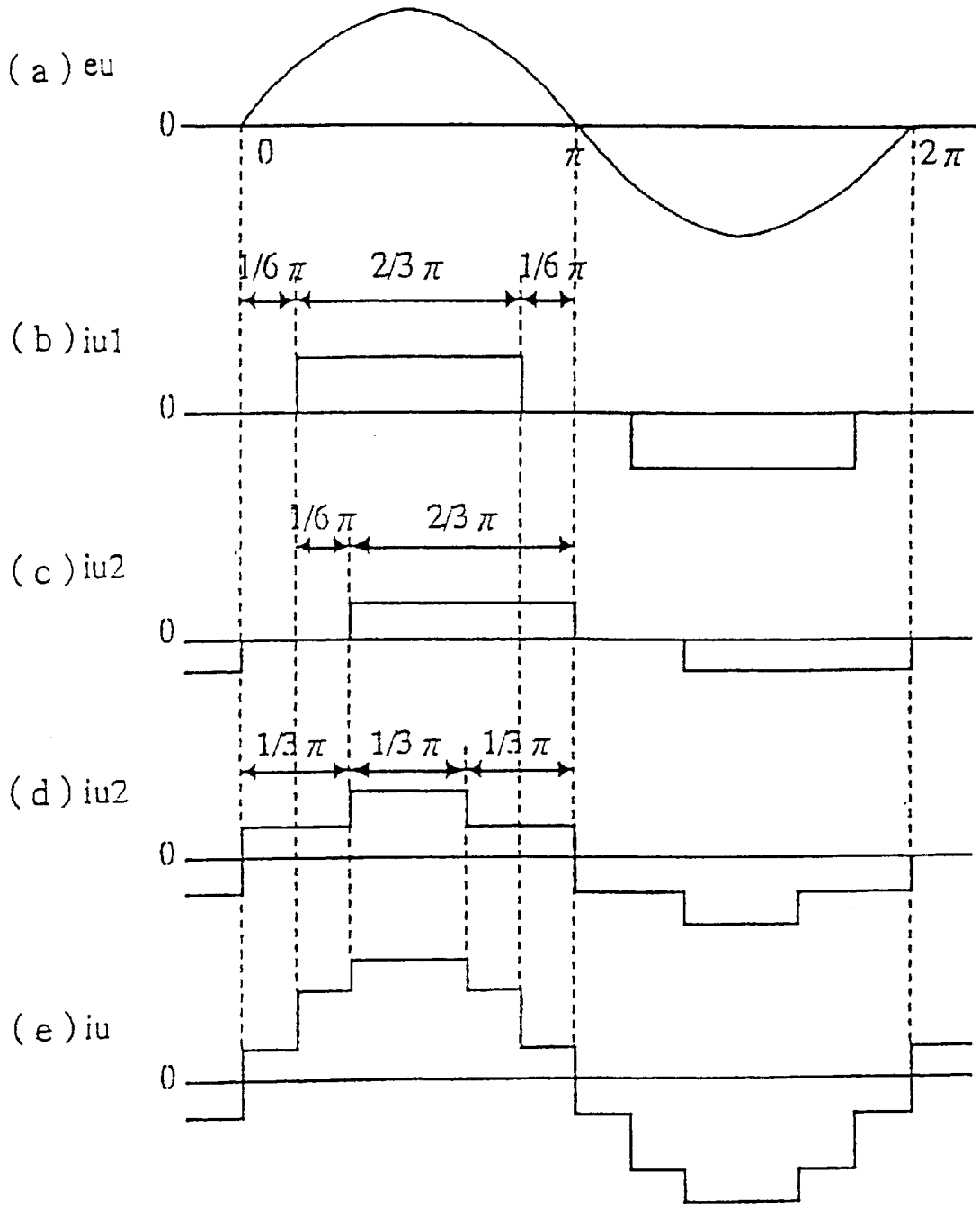
FIGS. 22(a) through 22(e) are diagrams illustrating waveforms of each section of the conventional three phase 12-pulses rectifier circuit system.

In this embodiment, the inverter control section 111, the difference calculation section 108, the PI circuit 109 and the driving circuit 105 can be realized by the micro-computer of the inverter. In this case, it is sufficient that only the two way switch and the driving circuit thereof are added, so that the converter with a low cost and a high power factor is realized. Further, this converter can increase the DC voltage more than the DC voltage of the converter illustrated in FIG. 19(a) so that the motor driving ability extent can be enlarged.

Figure 40:
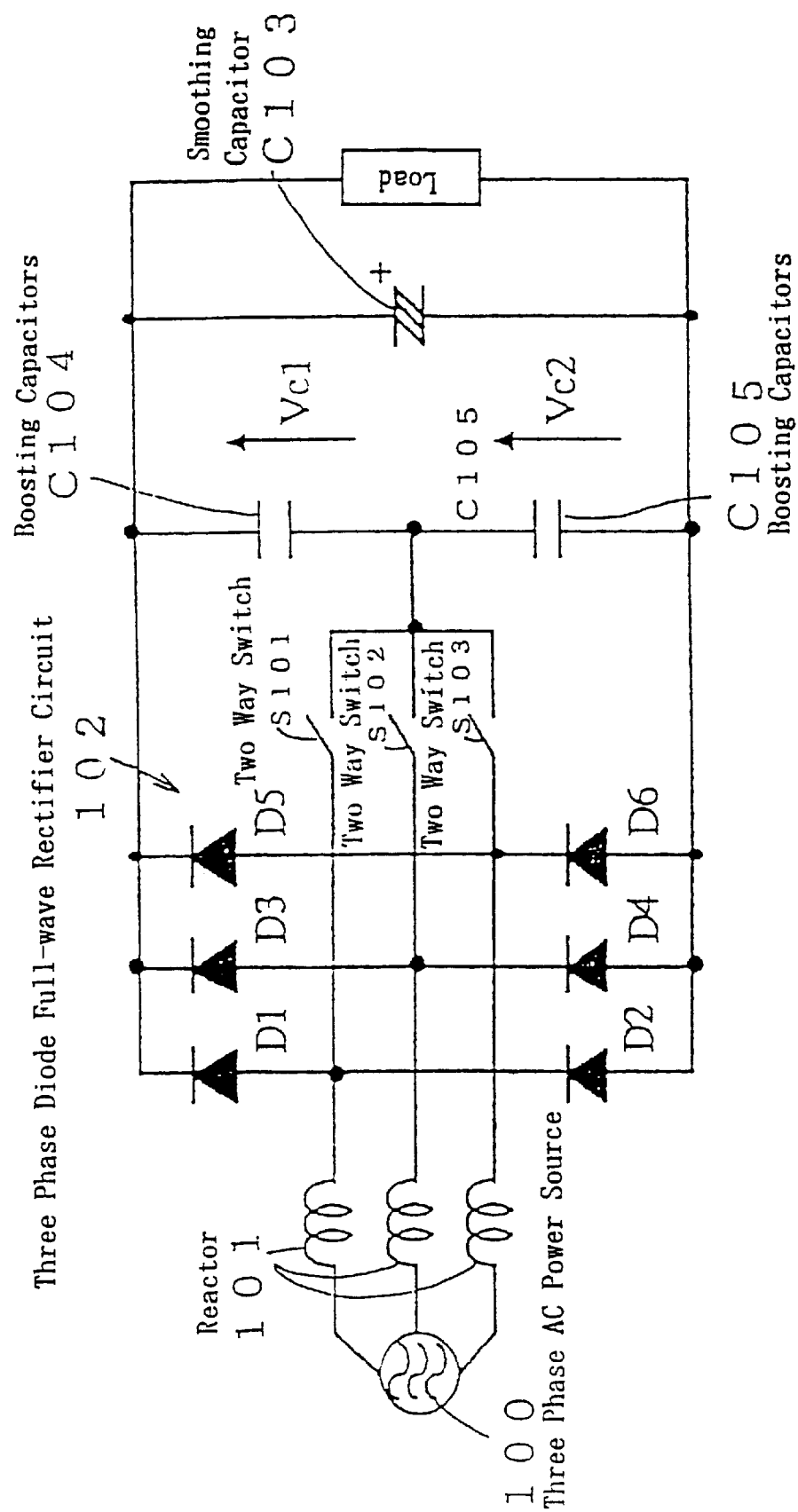
FIG. 40 is an electric circuit diagram illustrating a converter of a twelfth embodiment according to the present invention.

FIG. 40 is an electric circuit diagram illustrating a converter of a twelfth embodiment according to the present invention.

In the converter of FIG. 40, capacitances of boosting capacitors (voltage doubler capacitors) C104 and C105 connected in series to one another between the output terminals of the three phase diode full-wave rectifier circuit 102 are determined to be smaller (for example, about 1/10) than the capacitances of the smoothing capacitors C101 and C102 of each of the above converters. And, a smoothing capacitor C103 having a greater capacitance is connected in parallel to the series connection circuit of the pair of the boosting capacitors C104 and Cl05. Wherein, the capacitance of the series connection circuit of the smoothing capacitors C101 and C102 and the capacitance of the smoothing capacitor C103 are determined to be the same. Further, the arrangement for controlling the two way switch is similar to that of one of the above converters, therefore the arrangement is omitted its illustration in FIG. 40.

Figure 41:
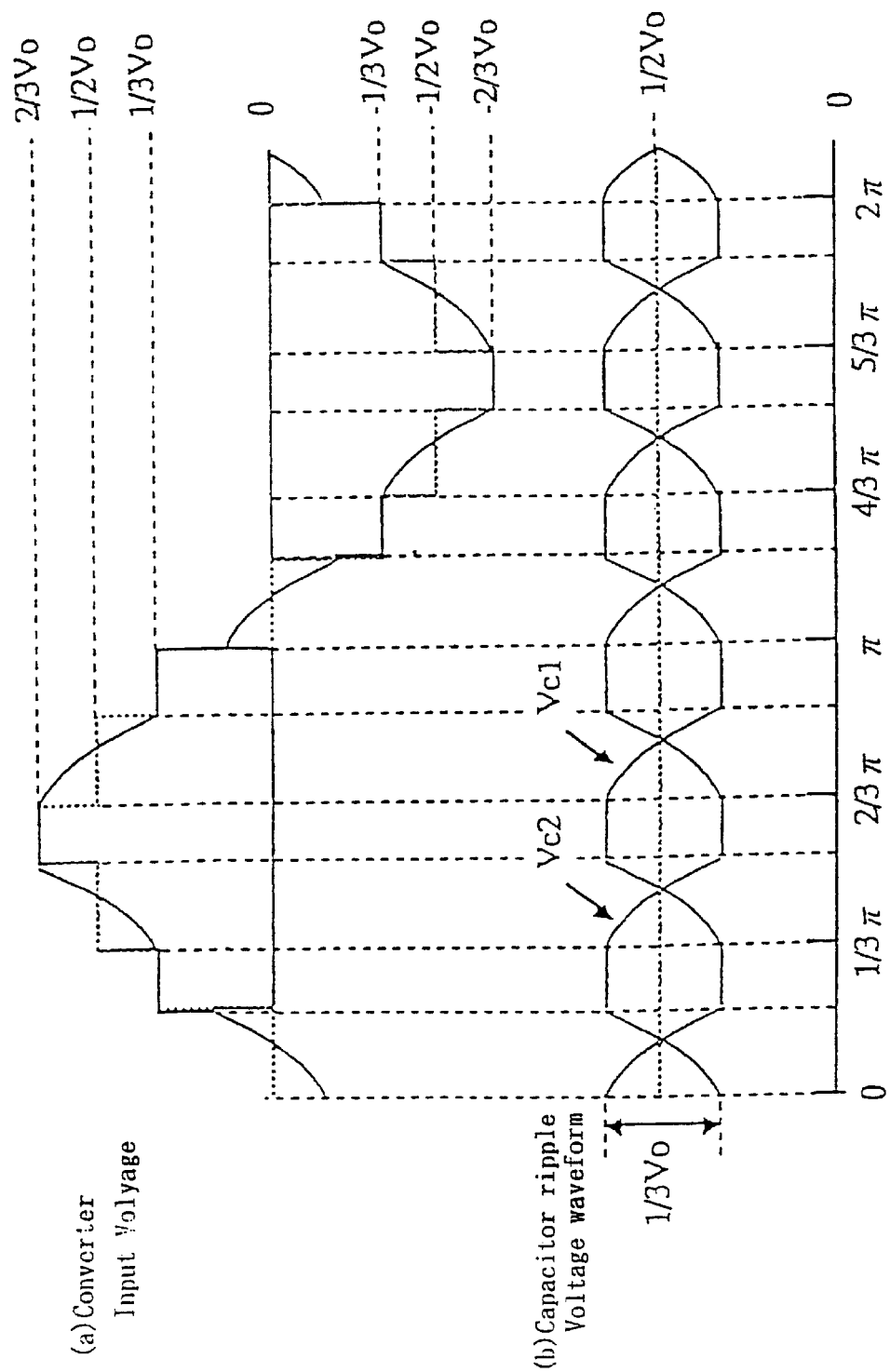
FIG. 41(a) is a diagram illustrating a converter input voltage waveform.
FIG. 41(b) is a diagram illustrating capacitor ripple voltage waveform.
Figure 42:
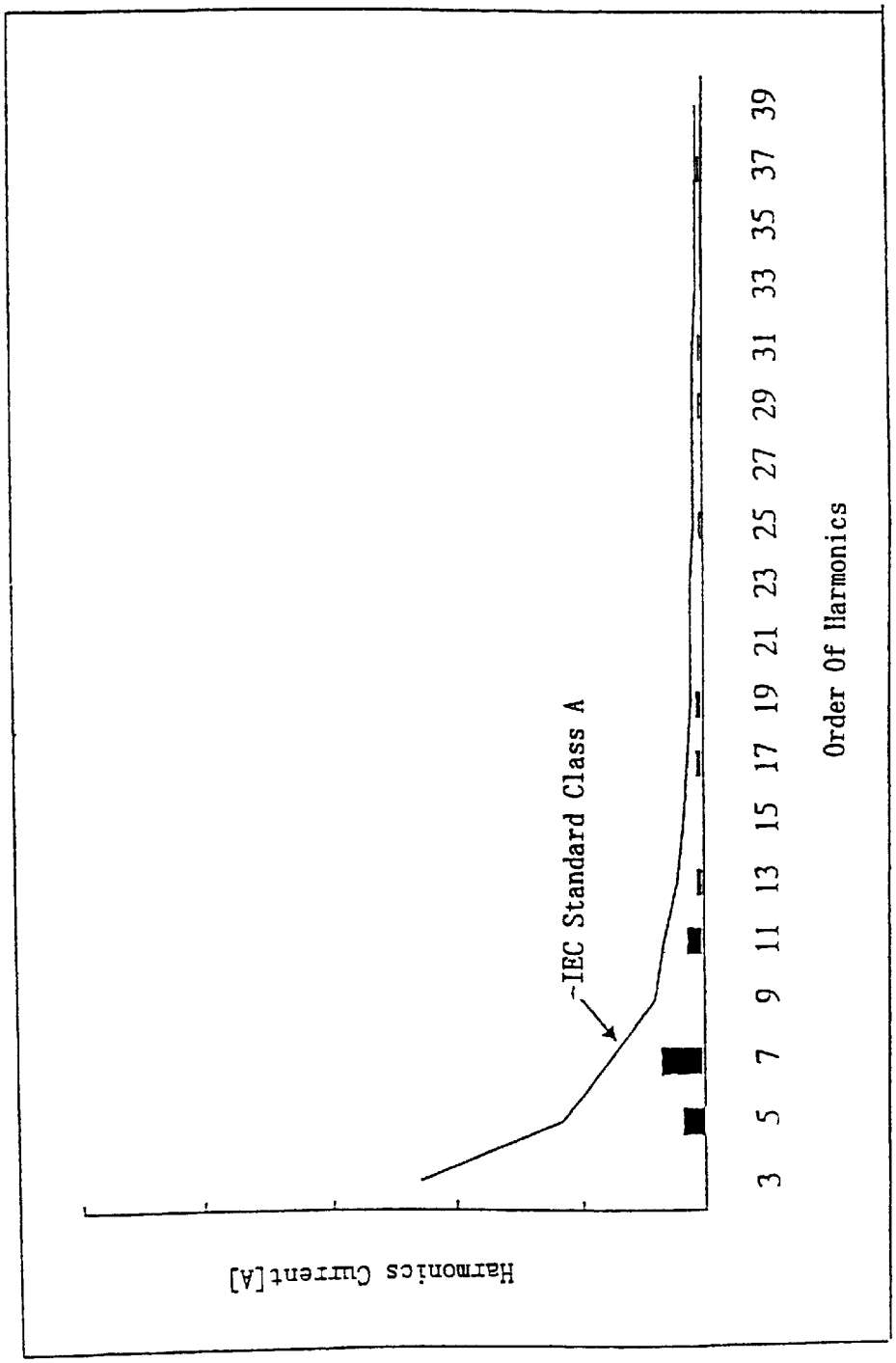
FIG. 42 is a diagram illustrating relationships between harmonics generation amounts of the converter of FIG. 41, and IEC-class A harmonics standards.

When this embodiment is employed, the center point voltage of the DC voltage is changed, as is illustrated in FIG. 41(b), so that the converter input voltage waveform becomes a waveform which is near the sine waveform, as is illustrated in FIG. 41(a). As a result, the harmonics components of the input current are reduced. Especially, the harmonics current of the orders (seventh, eleventh, seventeenth and nineteenth orders) which have no margin with respect to the standard values are reduced (refer to FIG. 42). Though, the fifth harmonics component is increased, it is not the problem because the fifth harmonics current has a sufficient margin originally with respect to the standard value.

Industrial Applicability

The present invention greatly simplifies the control of switching of a converter and realizes sufficient improvement in an input power factor and sufficient reducing of harmonics. The present invention is applicable as a power source device of an apparatus which requires a high input power factor and low harmonics.

What is claimed is:

1. A converter comprising:
   a reactor;
   a full-wave rectifier circuit having input terminals and output terminals which circuit is connected to an AC power source through the reactor;
   a smoothing capacitor which is connected between the output terminals of the full-wave rectifier circuit;
   boosting capacitors, each having a smaller capacitor than said smoothing capacitor, connected in series to each other and connected in parallel to the smoothing capacitor between the output terminals of the full-wave rectifier circuit;
   switching means connected between the input terminal of the full-wave rectifier circuit and a connecting point between the boosting capacitors, said switching means being a self-arc-extinguishing element; and
   control means for controlling the switching means so as to perform a switching operation in response to a change in power voltage.

2. A converter as set forth in claim 1, wherein the control means controls the switching means so as to perform a switching operation once for every half cycle of the power voltage.

3. A converter as set forth in claim 2, wherein the control means detects a zero-cross of the power voltage and outputs a control signal for turning the switching means ON for a predetermined time period in response to detection of the zero-cross.

4. A converter as set forth in claim 2, wherein the control means outputs a control signal for turning the switching means ON for a predetermined time period which includes a zero-cross time for the power voltage therein.

5. A converter as set forth in claim 4, wherein the control means outputs a control signal for turning the switching means ON for a predetermined time period having a center timing which is coincident to a zero-cross timing of the power voltage.

6. A converter as set forth in claim 4, wherein the control means outputs a control signal for turning the switching means ON for a predetermined time period which is determined to include a zero-cross timing of the power voltage and is determined so that its advance phase side time period is shorter than its delay phase side time period, both the advance phase side and the delay phase side time periods being determined with respect to the zero-cross timing.

7. A converter as set forth in claim 6, wherein the control means outputs a control signal for turning the switching means ON for a previously determined time period.

8. A converter as set forth in claim 6, wherein the control means compares a DC voltage supplied to a load and a DC voltage command value given from the exterior, and outputs a control signal for turning the switching means ON for a predetermined time period which approaches the DC voltage to the DC voltage command value.

9. A converter comprising:

reactors;

a three phase full-wave rectifier circuit having input terminals and output terminals which circuit is connected to a three phase power source through the reactors;

smoothing capacitors connected in series to one another and connected between the output terminals of the three phase full-wave rectifier circuit;

plural switching means each of which is connected between an input terminal of the three phase full-wave rectifier circuit and a connecting point between the smoothing capacitors, each said switching means being a self-arc-extinguishing element; and control means for controlling the switch means so as to perform a switching operation in response to a change in power voltage and/or a change in load.

10. A converter comprising; reactors;

a three phase full-wave rectifier circuit having input terminals and output terminals which circuit is connected to a three phase power source through the reactors;

boosting capacitors connected in series to one another and connected between the output terminals of the three phase full-wave rectifier circuit;

a smoothing capacitor connected in parallel to the boosting capacitors, the smoothing capacitor having capacitance which is greater than the capacitance of the boosting capacitors;

plural switching means each of which is connected between an input terminal of the three phase full-wave rectifier circuit and a connecting point between the boosting capacitors, each said switching means being a self-arc-extinuishing element; and control means for controlling the switching means so as to perform a switching operation in response to a cbange in power voltage and/or a change in load.

11. A converter as set forth in claim 9 or claim 10, wherein the control means controls the switching means so as to perform a switching operation once for every half cycle of the power voltage.

12. A converter as set forth in claim 11, wherein the control means determines an ON-time period of the switching means so as to remove or reduce specific harmonics components.

13. A converter as set forth in claim 12, wherein the control means detects load information and determines a timing for turning the switching means ON in response to the detection value.

14. A converter as set forth in claim 13, wherein the control means determines an ON-time period of the switching means and a timing for turning the switching means ON so that a fundamental wave of an input current and the power voltage are in a same phase.

15. A converter as set forth in claim 11, wherein the control means detects a DC voltage, calculates a difference between the detected DC voltage and a DC voltage command value, and determines an ON-time period of the switching means in response to the calculated difference.

* * * * *